United States Patent
Ohuchi et al.

(10) Patent No.: US 6,513,322 B2
(45) Date of Patent: Feb. 4, 2003

(54) DEVICE FOR CONTROLLING THE RISE OF THE CATALYST TEMPERATURE IN AN INTERNAL COMBUSTION ENGINE

(75) Inventors: Hirofumi Ohuchi; Tadahiro Azuma, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/789,633

(22) Filed: Feb. 22, 2001

(65) Prior Publication Data

US 2001/0007191 A1 Jul. 12, 2001

Related U.S. Application Data

(62) Division of application No. 09/332,159, filed on Jun. 14, 1999, now Pat. No. 6,212,884.

(30) Foreign Application Priority Data

Mar. 9, 1999 (JP) .............................................. 11-61718

(51) Int. Cl.$^7$ ................................................. F01N 3/00
(52) U.S. Cl. .............................. 60/285; 60/284; 60/299
(58) Field of Search ........................... 60/284, 285, 299, 60/301

(56) References Cited

U.S. PATENT DOCUMENTS

| | | | | |
|---|---|---|---|---|
| 4,484,548 A | | 11/1984 | Sugasawa et al. ............. | 60/285 |
| 4,656,829 A | | 4/1987 | Creps et al. .................... | 60/277 |
| 5,158,063 A | | 10/1992 | Hosoda et al. ................. | 60/277 |
| 5,535,586 A | * | 7/1996 | Ohta et al. ...................... | 60/285 |
| 5,566,547 A | * | 10/1996 | Hosoya et al. ................. | 60/284 |
| 5,570,575 A | | 11/1996 | Sato et al. ...................... | 60/285 |
| 5,577,383 A | | 11/1996 | Kuroda et al. ................. | 60/284 |
| 5,845,486 A | * | 12/1998 | Yamashita et al. ............ | 60/284 |
| 5,845,492 A | * | 12/1998 | Isobe et al. .................... | 60/284 |
| 5,881,552 A | * | 3/1999 | Iwata et al. .................... | 60/284 |
| 5,946,906 A | * | 9/1999 | Akazaki et al. ................ | 60/284 |
| 5,950,419 A | * | 9/1999 | Nishimura et al. ............ | 60/284 |
| 5,974,785 A | | 11/1999 | Cunningham .................. | 60/284 |
| 5,974,792 A | * | 11/1999 | Isobe ............................. | 60/284 |
| 6,032,753 A | * | 3/2000 | Yamazaki et al. ............. | 60/284 |
| 6,089,017 A | * | 7/2000 | Ogawa et al. .................. | 60/285 |
| 6,212,879 B1 | * | 4/2001 | Nishimura et al. ............ | 60/284 |
| 6,237,327 B1 | * | 5/2001 | Nishimura et al. ............ | 60/284 |

FOREIGN PATENT DOCUMENTS

| | | | | |
|---|---|---|---|---|
| JP | 51-79212 | | 11/1949 | |
| JP | 0065926 | | 4/1983 | ................... 60/285 |
| JP | 358158370 | * | 9/1983 | ............. 123/406.66 |
| JP | 60090940 | | 5/1985 | |
| JP | 1219340 | | 9/1989 | |
| JP | 3018643 | | 1/1991 | |

* cited by examiner

Primary Examiner—Thomas Denion
Assistant Examiner—Diem Tran
(74) Attorney, Agent, or Firm—Sughrue Mion, PLLC

(57) ABSTRACT

A device for controlling the rise of the catalyst temperature in an internal combustion engine, capable of quickly raising the catalyst temperature at the start to satisfy the exhaust gas regulations to a sufficient degree. The device comprises a means for picking up data corresponding to the temperature of the catalyst provided in the exhaust pipe of the internal combustion engine as catalyst temperature TC, a variety of sensors for detecting the operation conditions of the internal combustion engine, a means for controlling the air-to-fuel ratio of the internal combustion engine depending upon the operation conditions, and an air-to-fuel ratio lean-correction means S3 which, when the catalyst temperature is lower than a predetermined temperature corresponding to an activating temperature of the catalyst, corrects a target air-to-fuel ratio A/Fo toward the lean side to promote the activation of the catalyst, wherein the variety of sensors detect at least intake-air-amount data and crank angle data, and, when the temperature of the catalyst is lower than the predetermined temperature, the air-to-fuel ratio lean-correction means sets the target air-to-fuel ratio to a lean activating air-to-fuel ratio which is larger than an air-to-fuel ratio A/Fn of during the normally controlled operation and is higher than a stoichiometric air-to-fuel ratio.

8 Claims, 24 Drawing Sheets

FIG. 35
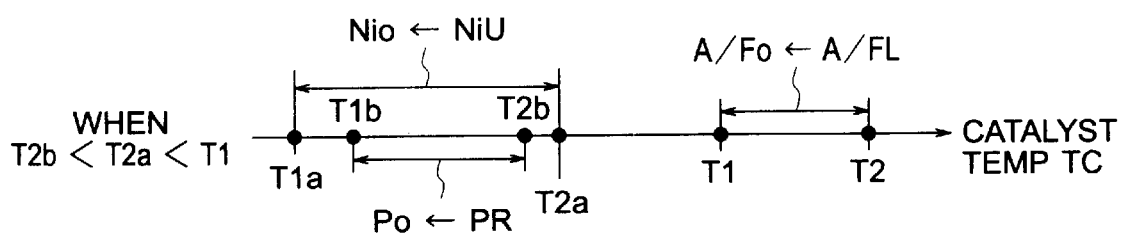
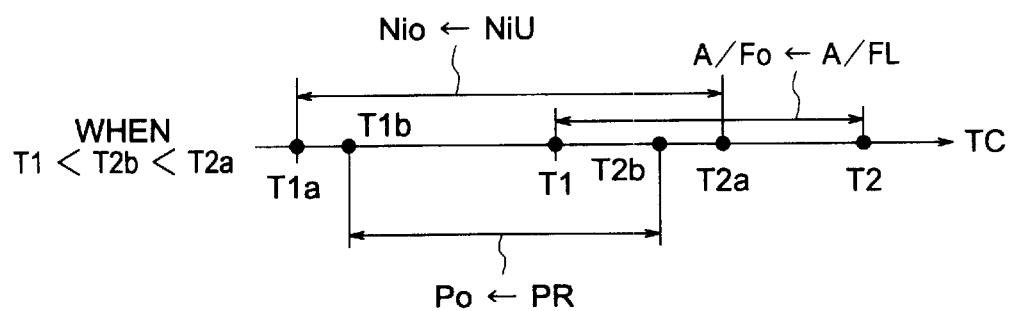

1 ENGINE
2 INTAKE PIPE
3 EXHAUST PIPE
5 AIR FLOW SENSOR
6 THROTTLE VALVE
7 BY-PATH
8 ISC VALVE
9 AIR-TO-FUEL RATIO SENSOR
11 CATALYST
12 INJECTOR
13 CRANK ANGLE SENSOR

DEVICE FOR CONTROLLING THE RISE OF THE CATALYST TEMPERATURE IN AN INTERNAL COMBUSTION ENGINE

This is a divisional of application Ser. No. 09/332,159 filed Jun. 14, 1999, now U.S. Pat. No. 6,212,884, the disclosure of which is incorporated herein by reference.

BACKGROUND OF THE INVENTION

1. Field of the Invention

The present invention relates to a device for controlling the rise of the catalyst temperature in a spark ignition-type internal combustion engine to meet exhaust gas regulations and, particularly, to a device for controlling the rise of the catalyst temperature in an internal combustion engine, which is capable of quickly raising the catalyst temperature up to an activating temperature.

2. Prior Art

The exhaust pipe of an internal combustion engine has heretofore been provided with a catalyst for removing exhaust gas components. The catalyst works at an activating temperature. When the internal combustion engine is cold, therefore, the temperature of the catalyst must be raised by, for example, exhaust gases of a high temperature.

In a conventional device for controlling the rise of the catalyst temperature in an internal combustion engine, therefore, a technology has been proposed such as delaying the ignition timing to promote the rise of the catalyst temperature at the start.

In a device for removing exhaust gas components disclosed in, for example, Japanese Unexamined Utility Model Publication (Kokai) No. 79212/1976, the heated secondary air is introduced into the intake system, and the ignition timing is delayed to quickly raise the temperature of the catalyst at the start.

FIG. 38 is a diagram illustrating the constitution of a conventional device for controlling the rise of the catalyst temperature in an internal combustion engine.

FIG. 39 is a diagram illustrating a change in the ratio for removing exhaust gas components relative to the catalyst temperature TC, wherein the abscissa represents the catalyst temperature TC and the ordinate represents the removal ratio [%].

In FIG. 39, a solid line represents a ratio for removing CO (carbon monoxide) and HC (hydrocarbons) and a broken line represents a ratio for removing NOx (nitrogen oxides). When the catalyst temperature TC rises and reaches an activation starting temperature (=130° C.), the removal ratio starts rising from 0%. When a completely activating temperature (=180° C.) is reached, the removal ratio reaches nearly a maximum value (=98%).

In FIG. 38, the main body of the internal combustion engine 1 is provided with an intake pipe 2 for introducing the air into the engine and an exhaust pipe 3 for exhausting the exhaust gases burnt in the engine 1.

An air cleaner 4 is provided in an upstream portion of the intake pipe 2, and an air flow sensor 5 for detecting the amount Qa of the air taken in by the engine 1 is provided on the downstream side of the air cleaner 4.

A throttle valve 6 is provided in the intake pipe 2 on the downstream side of the air flow sensor 5 to adjust the amount Qa of the air that is taken in.

The intake pipe 2 is further provided with a by-path 7 by-passing the throttle valve 6, and an idling rotational speed control valve (hereinafter referred to as ISC valve) 8 for adjusting the opening degree of the by-path 7.

The ISC valve 8 adjusts the amount of the air taken in by-passing the throttle valve 6, so that the idling rotational speed of the engine 1 is controlled to assume a target value.

The exhaust pipe 3 is provided with an air-to-fuel ratio sensor 9 for detecting the oxygen concentration in the exhaust gases as an air-to-fuel ratio A/F.

On the downstream side of the exhaust pipe 3, furthermore, there are provided catalysts 10 and 11 for removing exhaust gas components relying upon the chemical reaction. The one catalyst 10 is provided in a hanging portion in the exhaust pipe 3 and another catalyst 11 is provided in the exhaust pipe 3 under the floor.

Generally, the catalysts 10 and 11 are called three-way catalysts, and work to oxidize CO and HC, and to reduce NOx, thereby to remove harmful components in the exhaust gases.

An intake portion corresponding to each cylinder of the engine 1 is provided with an injector 12 for injecting the fuel that is sent from a fuel pump (not shown).

The engine 1 is further provided with a crank angle sensor 13 that produces a crank angle signal CA corresponding to the rotational speed Ne of the engine.

Based on the operation condition data (amount Qa of the air taken in, air-to-fuel ratio A/F, crank angle signal CA, etc.) input from the sensors, an electronic control unit (hereinafter referred to as ECU) 14 including a microcomputer operates the control quantity for the engine 1, and produces a fuel injection signal J for driving the injector 12, an ISC control signal C for driving the ISC valve 8, an ignition signal P for driving an ignition device (described later) and the like signals.

Here, though not diagramed, a variety of sensors for detecting the operation conditions of the engine 1 include a water-temperature sensor for detecting the cooling water temperature TW of the engine, an intake-air-temperature sensor for detecting the temperature of the air taken in, and the like sensors.

The ignition device is constituted by spark plugs (not shown) provided in the cylinders of the engine 1, an ignition coil 15 connected to a battery to apply a high voltage to the spark plugs, and an igniter 16 which makes and breaks the spark coil 15 in response to the ignition signal P.

Next, described below is the operation of the conventional device for controlling the rise of the catalyst temperature in an internal combustion engine shown in FIG. 38.

First, the injector 12 injects the fuel of a required amount into the engine 1 depending upon the width of a drive pulse which is a fuel injection signal J. In response to the ignition signal P, furthermore, the igniter 16 makes and breaks the ignition coil 15 to apply a high voltage to the spark plug thereby to ignite the mixture in the cylinder.

At this moment, the amount of fuel injected from the injector 12 is calculated depending upon the amount Qa of the air taken in and the rotational speed Ne of the engine, and is corrected based on the air-to-fuel ratio A/F.

The ignition timing is set based on the amount Qa of the air taken in and the rotational speed Ne of the engine.

As is well known, furthermore, the fuel injection timing and the ignition timing are operated by using a pulse edge (reference crank angle position) of the crank angle signal CA as a timer control reference.

The mixture burnt in the engine 1 is exhausted as exhaust gases through the exhaust pipe 3, and from which harmful components are removed through the catalysts 10 and 11.

The temperature range in which the catalysts 10 and 11 are used is usually from about 130° C. to about 900° C.

When the temperatures of the catalysts 10 and 11 are to be quickly raised, in general, the ignition signal P is corrected by operation and the target ignition timing is corrected toward the delay side as disclosed in the above-mentioned known literature.

Upon delaying the ignition timing, the exhaust gases of a high temperature right after (or during) the combustion are exhausted into the exhaust pipe 3, and the temperatures of the catalysts 10 and 11 are quickly raised from the cold engine temperature up to an activating temperature.

During the idling operation condition, on the other hand, the throttle valve 6 is fully closed and the vehicle comes into a halt. The ECU 14, however, adjusts the opening degree of the ISC valve 8 to control the idling rotational speed.

That is, during the idling operation condition, the ECU 14 operates the amount of the air taken in through the by-path to obtain a target idling rotational speed and produces an ISC control signal C, and further corrects the ISC control signal C based on a deviation between a real engine rotational speed Ne and the target idling rotational speed in order to control the amount of the air taken in through the by-path (to control the opening degree of the ISC valve 8) by feedback.

When the engine 1 is cold, the target idling rotational speed is increased by a predetermined amount (100 rpm to 200 rpm) so that the engine 1 assumes a stable combustion.

In recent years, however, regulations against the exhaust gases have been reinforced as LEVs (low-emission vehicles) have been developed. To cope with the regulations, therefore, the catalyst temperatures must be raised up to the activating temperature more quickly. In quickly activating the catalysts, furthermore, it is required to avoid deterioration in the fuel efficiency and drivability.

According to the conventional device for controlling the rise of catalyst temperature in an internal combustion engine as described above, the temperature of the catalyst could not be very quickly raised despite the ignition timing was corrected toward the delay side and, hence, the exhaust gas components could not be removed to a degree that satisfies the exhaust gas regulations at the start or during the idling operation condition.

SUMMARY OF THE INVENTION

The present invention was accomplished in order to solve the above-mentioned problems, and its object is to provide a device for controlling the rise of the catalyst temperature in an internal combustion engine, which makes it possible to satisfy the exhaust gas regulations to a sufficient degree as a result of correcting the air-to-fuel ratio toward the lean side and increasing the idling rotational speed by an amount larger than that of when normally corrected toward the increasing side (normally controlled condition), so that the temperature of the catalyst can be quickly raised even at the start or during the idling operation condition.

The present invention provides a device for controlling the rise of the catalyst temperature in an internal combustion engine comprising:

a catalyst which is a three-way converter provided in an exhaust pipe of the internal combustion engine;

a catalyst temperature pick-up means for picking up data corresponding to the temperature of the catalyst as catalyst temperature;

a variety of sensors for detecting the operation conditions of said internal combustion engine;

an air-to-fuel ratio control means for controlling the air-to-fuel ratio of the internal combustion engine depending upon the operation conditions; and an air-to-fuel ratio lean-correction means which, when said catalyst temperature is lower than a predetermined temperature corresponding to an activating temperature of said catalyst, corrects a target air-to-fuel ratio of said internal combustion engine toward the lean side to promote the activation of said catalyst;

wherein said variety of sensors detect at least intake-air-amount data corresponding to the load on said internal combustion engine and crank angle data corresponding to the rotational speed of said internal combustion engine; and when the temperature of said catalyst is lower than said predetermined temperature, said air-to-fuel ratio lean-correction means sets said target air-to-fuel ratio to a lean activating air-to-fuel ratio which is larger than an air-to-fuel ratio of during the normally controlled operation and is higher than a stoichiometric air-to-fuel ratio.

The invention further provides a device for controlling the rise of the catalyst temperature in an internal combustion engine, wherein said air-to-fuel ratio lean-correction means includes a first comparator means for comparing said catalyst temperature with a first predetermined temperature near said activating temperature, and a second comparator means for comparing said catalyst temperature with a second predetermined temperature which is higher than said first predetermined temperature and is corresponding to said activating temperature, and when said catalyst temperature lies within a range between said first predetermined temperature and said second predetermined temperature, said target air-to-fuel ratio is set to said lean activating air-to-fuel ratio.

The invention further provides a device for controlling the rise of the catalyst temperature in an internal combustion engine, wherein said air-to-fuel ratio lean-correction means includes a tailing means for gradually changing said target air-to-fuel ratio when said target air-to-fuel ratio is to be changed over, and said tailing means gradually increases said target air-to-fuel ratio from an air-to-fuel ratio of during said normally controlled operation up to said lean activating air-to-fuel ratio every time by a predetermined value when said catalyst temperature is higher than said first predetermined temperature, and gradually decreases said target air-to-fuel ratio from said lean activating air-to-fuel ratio down to said air-to-fuel ratio of during said normally controlled operation every time by a predetermined value when said catalyst temperature is higher than said second predetermined temperature.

The invention further provides a device for controlling the rise of the catalyst temperature in an internal combustion engine, wherein said catalyst temperature pick-up means includes a temperature sensor that is provided on said catalyst to directly detect the temperature of said catalyst.

The invention further provides a device for controlling the rise of the catalyst temperature in an internal combustion engine, wherein said catalyst temperature pick-up means includes an exhaust gas temperature sensor provided in the exhaust pipe of said internal combustion engine to detect the temperature of the exhaust gases, and a catalyst temperature estimating means for estimating the temperature of said catalyst based on said exhaust gas temperature.

The invention further provides a device for controlling the rise of the catalyst temperature in an internal combustion engine, wherein said catalyst temperature pick-up means includes a catalyst temperature estimating means for estimating the temperature of said catalyst based at least upon the intake-air-amount data of said internal combustion engine.

The invention further provides a device for controlling the rise of the catalyst temperature in an internal combustion engine, wherein said catalyst temperature estimating means includes an initial temperature estimating means for estimating the initial temperature of said catalyst, and said initial temperature estimating means estimates the initial temperature of said catalyst based on at least the water temperature of said internal combustion engine at the start and the temperature of the air taken in at the start.

The invention further provides a device for controlling the rise of the catalyst temperature in an internal combustion engine, wherein said initial temperature estimating means estimates the water temperature at the start as the initial temperature of said catalyst when the water temperature at the start is nearly equal to the temperature of the air taken in at the start, and estimates the initial temperature of said catalyst based on a deviation between the water temperature at the start and the temperature of the air taken in at the start when the water temperature at the start is different from the temperature of the air taken in at the start.

The invention further provides a device for controlling the rise of the catalyst temperature in an internal combustion engine, wherein said catalyst temperature estimating means sets the water temperature of said internal combustion engine at the start as the initial catalyst temperature, and estimates said catalyst temperature based upon the amount of generated heat calculated from said intake-air-amount data and the heat capacity of the exhaust system inclusive of said exhaust pipe.

The invention further provides a device for controlling the rise of the catalyst temperature in an internal combustion engine, wherein said predetermined temperature is set to a value which is obtained by adding a predetermined margin temperature to said catalyst activating temperature.

The invention further provides a device for controlling the rise of the catalyst temperature in an internal combustion engine, wherein said predetermined temperature is set to a value which is obtained by subtracting a predetermined margin temperature from said catalyst activating temperature.

The present invention further provides a device for controlling the rise of the catalyst temperature in an internal combustion engine comprising:
 a catalyst which is a three-way converter provided in an exhaust pipe of the internal combustion engine;
 a catalyst temperature pick-up means for picking up data corresponding to the temperature of the catalyst as catalyst temperature;
 a variety of sensors for detecting the operation conditions of said internal combustion engine;
 an idling control means for controlling the idling rotational speed of said internal combustion engine depending upon said operation conditions; and
 an idling rotational speed increasing means which, when said catalyst temperature is lower than a predetermined temperature corresponding to an activating temperature of said catalyst, corrects a target idling rotational speed of said internal combustion engine toward the increasing side higher than the idling rotational speed of during the normally controlled operation in order to promote the activation of said catalyst;
 wherein, when said catalyst temperature is lower than said predetermined temperature, said idling rotational speed increasing means sets said target idling rotational speed to an increased activating rotational speed higher than the idling rotational speed of during said normally controlled operation for a predetermined period of time until said catalyst temperature reaches said activating temperature.

The invention further provides a device for controlling the rise of the catalyst temperature in an internal combustion engine, wherein said idling rotational speed increasing means includes a first comparator means for comparing said catalyst temperature with a first predetermined temperature lower than said activating temperature, and a second comparator means for comparing said catalyst temperature with a second predetermined temperature which is higher than said first predetermined temperature and is corresponding to said activating temperature, and sets said target idling rotational speed to said increased activating rotational speed when said catalyst temperature lies within a range between said first predetermined temperature and said second predetermined temperature.

The invention further provides a device for controlling the rise of the catalyst temperature in an internal combustion engine, wherein said idling rotational speed increasing means includes a tailing means for gradually changing said target idling rotational speed when said target idling rotational speed is to be changed over, and said tailing means gradually increases said target idling rotational speed from the idling rotational speed of during said normally controlled operation up to said increased activating rotational speed every time by a predetermined value when said catalyst temperature is higher than said first predetermined temperature, and gradually decreases said target idling rotational speed from said increased activating rotational speed down to the idling rotational speed of during said normally controlled operation when said catalyst temperature is higher than said second predetermined temperature.

The invention further provides a device for controlling the rise of the catalyst temperature in an internal combustion engine, wherein said catalyst temperature pick-up means includes a catalyst temperature estimating means for estimating the temperature of said catalyst based on at least the water temperature of said internal combustion engine at the start and the intake-air-amount data.

The invention further provides a device for controlling the rise of the catalyst temperature in an internal combustion engine, wherein said idling rotational speed increasing means sets the increased activating rotational speed depending on the heat capacity of the exhaust system inclusive of said exhaust pipe.

The invention further provides a device for controlling the rise of the catalyst temperature in an internal combustion engine, wherein said idling rotational speed increasing means sets, as said increased activating rotational speed, said target idling rotational speed to a value which is higher by about 100 rpm than the idling rotational speed of during the normally controlled operation.

The invention further provides a device for controlling the rise of the catalyst temperature in an internal combustion engine, further comprising:
 an air-to-fuel ratio control means for controlling the air-to-fuel ratio of said internal combustion engine depending upon the operation conditions; and
 an air-to-fuel ratio lean-correction means for setting the target air-to-fuel ratio of said internal combustion engine to a lean activating air-to-fuel ratio which is larger than the air-to-fuel ratio of during the normally controlled operation and is larger than the stoichiometric air-to-fuel ratio when said catalyst temperature is lower than said predetermined temperature.

The invention further provides a device for controlling the rise of the catalyst temperature in an internal combustion engine, further comprising:

an ignition timing control means for controlling the ignition timing of said internal combustion engine depending upon the operation conditions; and an ignition timing delaying means for correcting a target ignition timing of said internal combustion engine to a delayed activating ignition timing on the side delayed behind the ignition timing of during the normally controlled operation over a second predetermined period of time when said catalyst temperature is lower than said predetermined temperature.

The invention further provides a device for controlling the rise of the catalyst temperature in an internal combustion engine, wherein said ignition timing delaying means includes:

a first comparator means for comparing said catalyst temperature with a first predetermined temperature lower than said activating temperature;

a second comparator means for comparing said catalyst temperature with a second predetermined temperature higher than said first predetermined temperature and is corresponding to said activating temperature; and a tailing means for gradually changing said target ignition timing when said target ignition timing is to be changed over;

wherein said tailing means gradually delays said target ignition timing from the ignition timing of during said normally controlled operation to said delayed activating ignition timing every time by a predetermined value when said catalyst temperature is higher than said first predetermined temperature, and gradually advances said target ignition timing from said delayed activating ignition timing to the ignition timing of during said normally controlled operation every time by a predetermined value when said catalyst temperature is higher than said second predetermined temperature.

BRIEF DESCRIPTION OF THE DRAWINGS

FIG. 35 is a diagram illustrating the control operation by combining the correction of the idling rotational speed toward the increasing side, correction of the air-to-fuel ratio toward the lean side and the correction of the ignition timing toward the delay side according to the embodiment 8 of the present invention;

DESCRIPTION OF THE PREFERRED EMBODIMENTS

Embodiment 1

Figure 1:
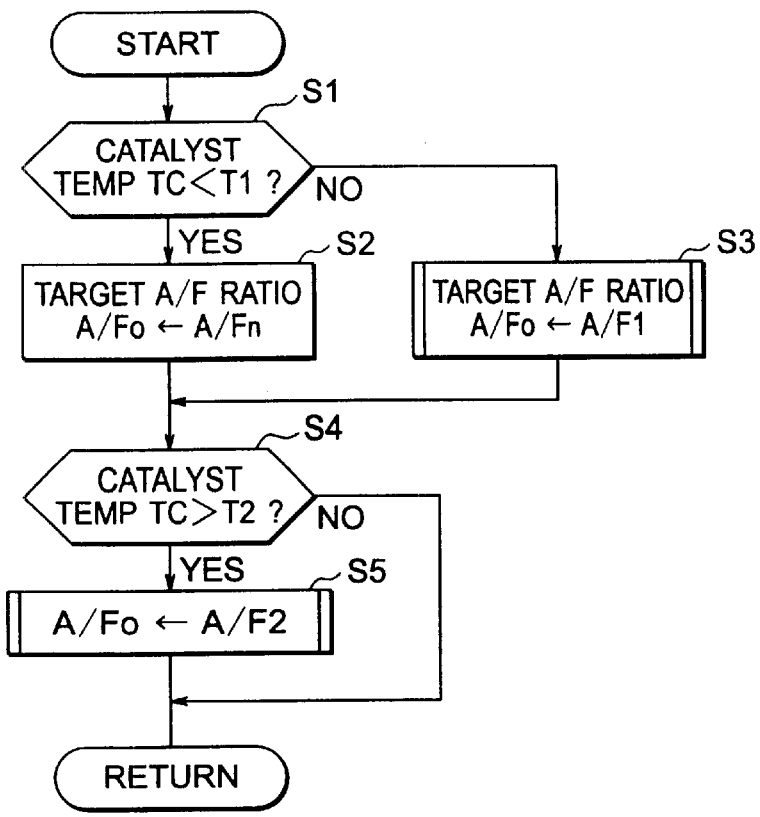
FIG. 1 is a flow chart illustrating the operation for controlling the air-to-fuel ratio according to an embodiment 1 of the present invention.

An embodiment 1 of the present invention will now be described with reference to the drawings.

The whole constitution of the device according to the embodiment 1 of the present invention is the same as the one described earlier (see FIG. 38), but the operation program in the ECU 14 is only partly different.

In this case, catalyst temperature pick-up means are provided to pick up data corresponding to the temperatures of the catalysts 10, 11 as catalyst temperatures TC, the catalyst temperature pick-up means being constituted by temperature sensors (not shown) that are provided on the catalysts 10, 11 to directly detect the catalyst temperatures TC.

A variety of sensors are provided, such as an air flow sensor 5 for detecting the amount Qa of the air taken in, a crank angle sensor 13 for forming a crank angle signal CA (engine rotational speed Ne), as well as a water temperature sensor for detecting the cooling water temperature TW of the engine 1.

The ECU 14 comprises an air-to-fuel ratio control means for controlling the air-to-fuel ratio A/F of the engine 1 depending upon the operation conditions, and an air-to-fuel ratio lean-correction means for setting a target air-to-fuel ratio A/Fo of the engine 1 to a lean activating air-to-fuel ratio A/FL (=16.0) which is larger than the air-to-fuel ratio of during the normally controlled operation and is larger than the stoichiometric air-to-fuel ratio (=14.7) when the catalyst temperature TC is lower than a predetermined temperature T2 corresponding to the activating temperature (activation starting temperature: 130° C.).

The air-to-fuel ratio lean-correction means in the ECU 14 includes a first comparator means for comparing the catalyst temperature TC with a first predetermined temperature T1 near the activating temperature and a second comparator means for comparing the catalyst temperature TC with a second predetermined temperature T2 which is higher than the first predetermined temperature T1 and is corresponding to the activating temperature. When the catalyst temperature TC lies within a range between the first predetermined temperature T1 and the second predetermined temperature T2, the air-to-fuel ratio lean-correction means sets the target air-to-fuel ratio A/Fo to the lean activating air-to-fuel ratio A/FL.

When the catalyst temperature TC is lower than the first predetermined temperature T1 or is higher than the second predetermined temperature T2, therefore, the air-to-fuel ratio control means in the ECU 14 sets the target air-to-fuel ratio A/Fo to an air-to-fuel ratio A/Fn (14.7 or smaller) of under normally controlled operation (rich side).

That is, when the catalyst temperature TC is very lower than the activating temperature (TC<T1), the ECU 14 elevates the exhaust gas temperature TH relying on the air-to-fuel ratio A/Fn of during the normally controlled operation (rich side) to activate the catalyst and, after the catalyst temperature TC has reached the activating temperature (TC>T2), executes the control operation by feedback relying on the air-to-fuel ratio A/Fn of during the normally controlled operation.

When the catalyst temperature TC remains low near the activating temperature (T1≦TC≦T2), on the other hand, the target air-to-fuel ratio A/FO is set to the lean activating air-to-fuel ratio A/FL to increase the amount of oxygen in the exhaust gases, so that the catalytic reaction temperature is raised due to the oxidation reaction and that the activation of catalyst is promoted.

The air-to-fuel ratio lean-correction means in the ECU 14 includes a tailing means for gradually changing the target air-to-fuel ratio A/Fo at the time when the target air-to-fuel ratio A/Fo is to be changed over.

That is, when the catalyst temperature TC becomes higher than the first predetermined temperature T1, the tailing means in the air-to-fuel ratio lean-correction means gradually increases the target air-to-fuel ratio A/Fo from the air-to-fuel ratio A/Fn of during the normally controlled operation up to the lean activating air-to-fuel ratio A/FL every time by a predetermined value ΔF1.

When the catalyst temperature TC becomes higher than the second predetermined temperature T2, furthermore, the tailing means gradually decreases the target air-to-fuel ratio A/Fo from the lean activating air-to-fuel ratio A/FL down to the air-to-fuel ratio A/Fn of during the normally controlled operation every time by a predetermined value ΔF2.

Figure 38:
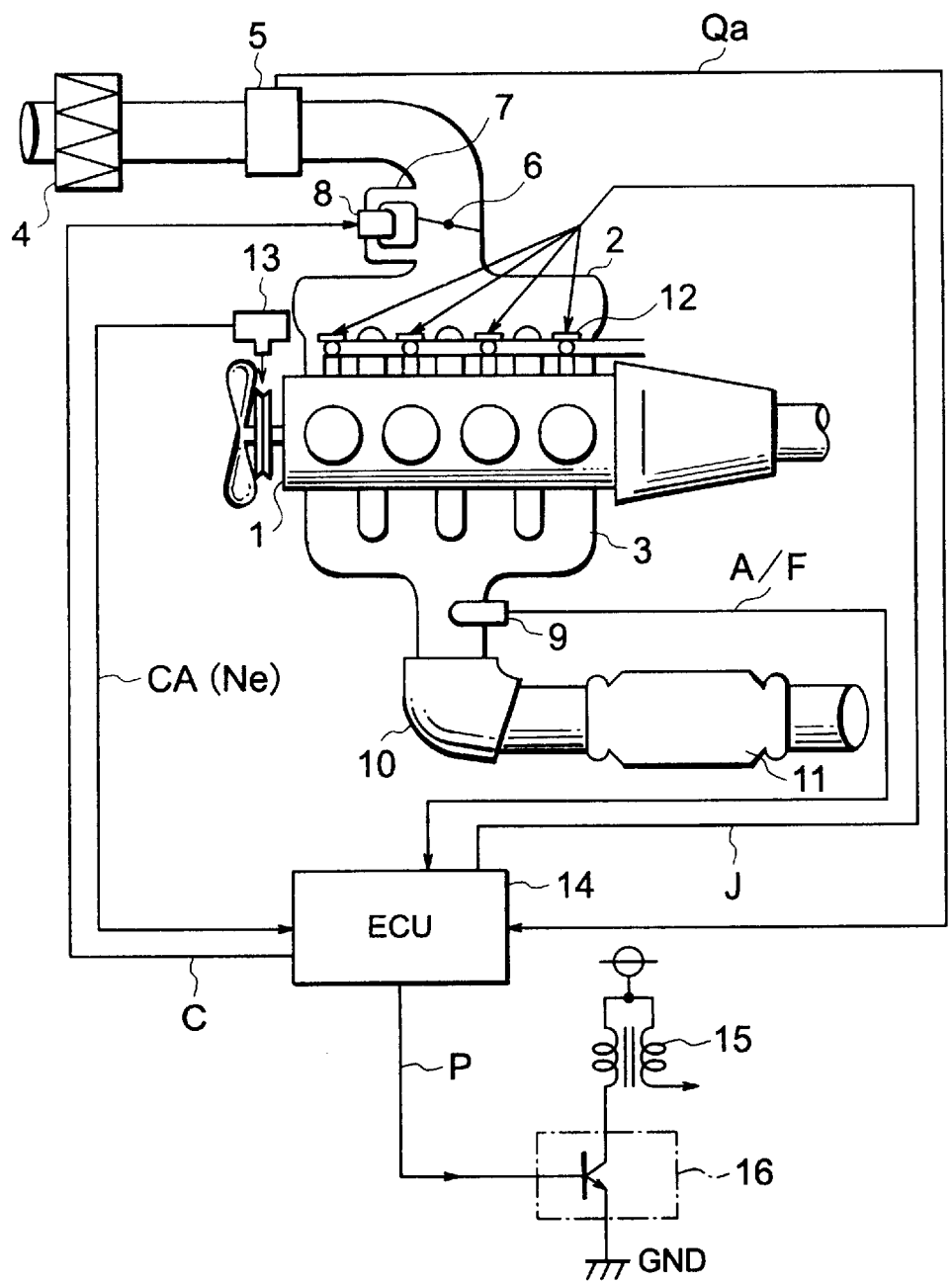
FIG. 38 is a diagram of circuit constitution illustrating a conventional device for controlling the rise of the catalyst temperature in an internal combustion engine.
Figure 39:
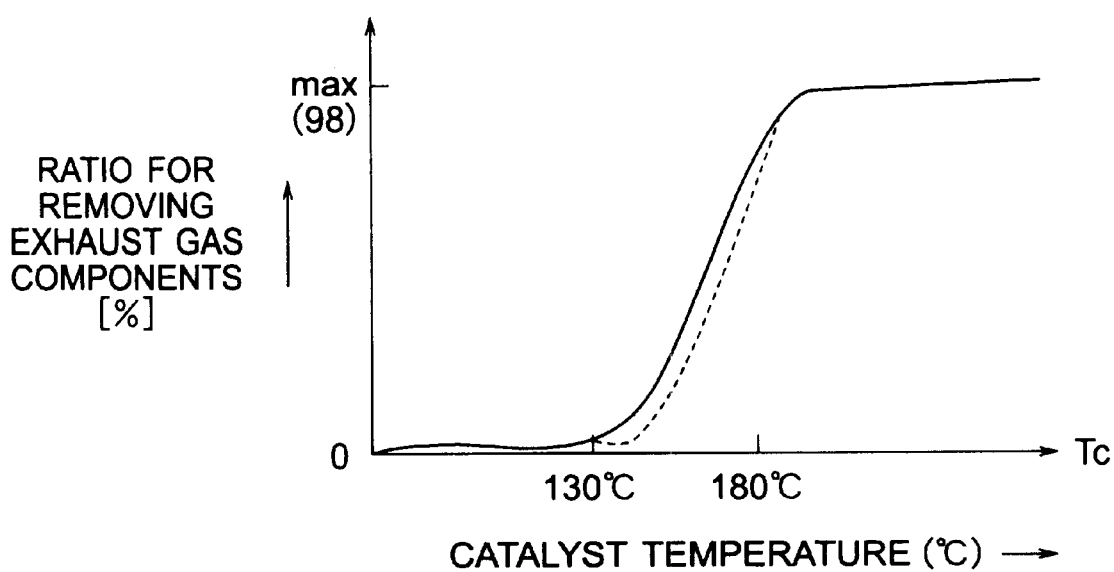
FIG. 39 is a diagram illustrating a general change in the ratio for removing exhaust gas components depending upon the catalyst temperature.

Next, the operation of the embodiment 1 of the present invention will be described with reference to FIGS. 1 to 12 together with FIGS. 38 and 39.

FIG. 1 is a flow chart illustrating the operation for controlling the air-to-fuel ratio depending upon the catalyst temperature according to the embodiment 1 of the present invention.

Figure 2:
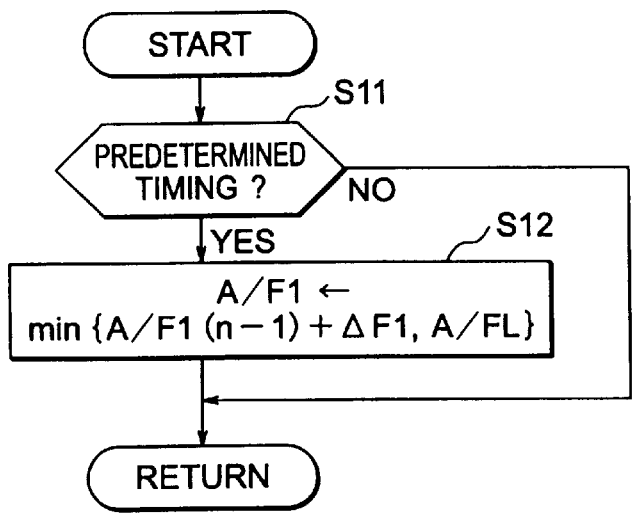
FIG. 2 is a flow chart concretely illustrating the tailing processing operation (step S3) for correcting the air-to-fuel ratio toward the lean side according to the embodiment 1 of the present invention.
Figure 3:
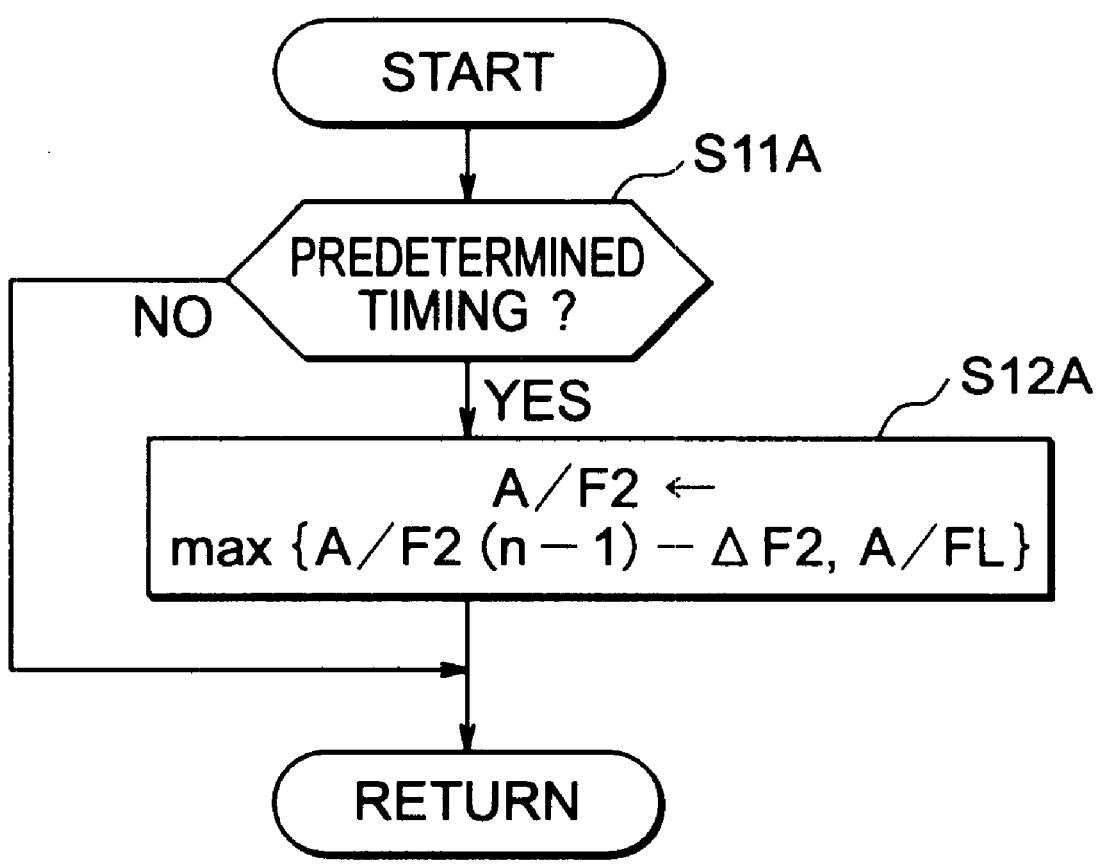
FIG. 3 is a flow chart concretely illustrating the tailing processing operation (step S5) for restoring the normal air-to-fuel ratio according to the embodiment 1 of the present invention.

FIG. 2 is a flow chart illustrating a step S3 of FIG. 1 (first tailing processing with the lean activating air-to-fuel ratio A/FL as a target value), and FIG. 3 is a flow chart illustrating a step S5 of FIG. 1 (second tailing processing with the air-to-fuel ratio A/Fn during the normally controlled operation as a target value).

Figure 4:
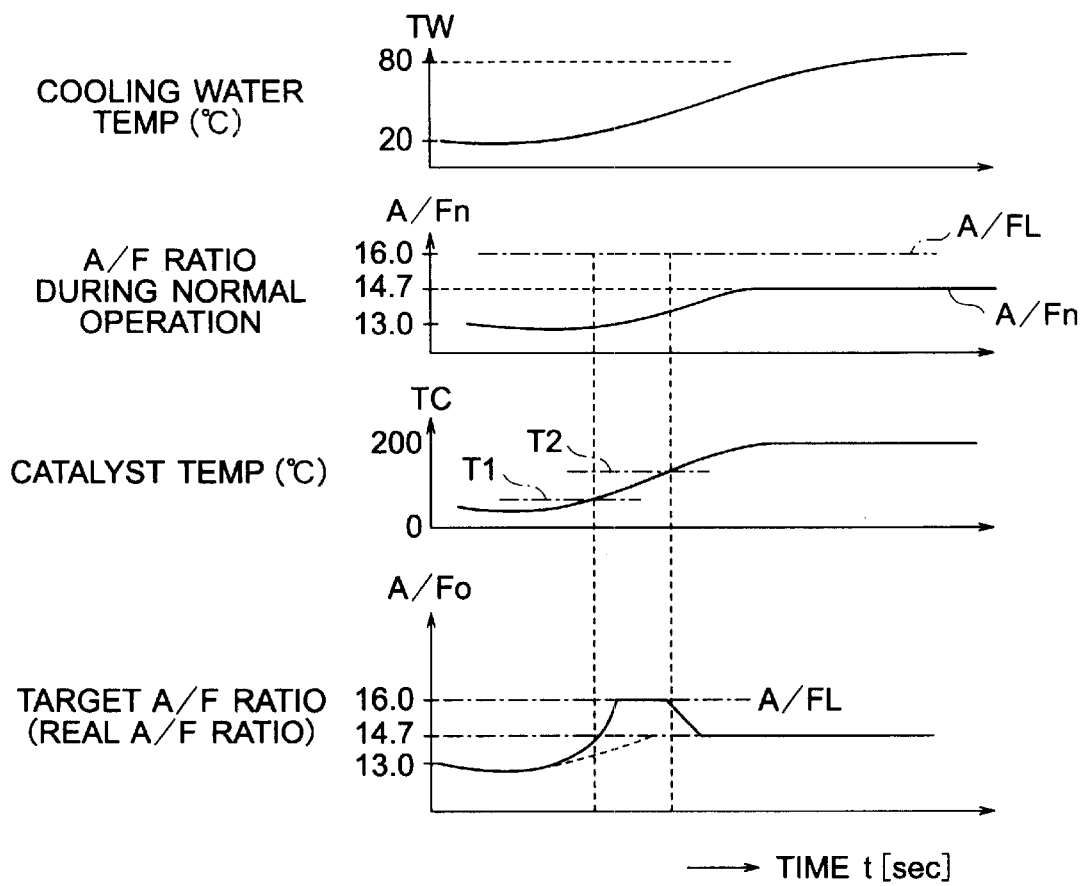
FIG. 4 is a timing chart for explaining the operation for correcting the air-to-fuel ratio toward the lean side according to the embodiment 1 of the present invention.

FIG. 4 is a timing chart illustrating changes in the cooling water temperature TW, air-to-fuel ratio A/Fn during the normally controlled operation, catalyst temperature TC and target air-to-fuel ratio A/Fo with the lapse of time.

In FIG. 4, the catalyst temperature TC rises with a rise in the cooling water temperature TW and in the air-to-fuel ratio A/Fn of during the normally controlled operation.

The lean activating air-to-fuel ratio A/FL (a dot-dash chain line) for promoting the activation of the catalyst is set to a value higher than the air-to-fuel ratio A/Fn (stoichiometric air-to-fuel ratio: 14.7) of during the normally controlled operation.

Here, the lean air-to-fuel ratio A/FL is set to be about "16.0" which, however, can be set to any value provided it is larger than, or on the lean side of, the stoichiometric air-to-fuel ratio (14.7).

Referring to FIG. 4, when the catalyst temperature TC is higher than the first predetermined temperature T1 (about 70° C. which is lower than the activating temperature) but is lower than the second predetermined temperature T2 (about 130° C. corresponding to the activating temperature), the target air-to-fuel ratio A/Fo is set to a lean activating air-to-fuel ratio A/FL which is usually obtained by operation and is larger than a conventional value (broken line). At the time of changing over the control operation, furthermore, the target air-to-fuel ratio A/Fo is gradually increased or decreased by the tailing processing.

Figure 5:
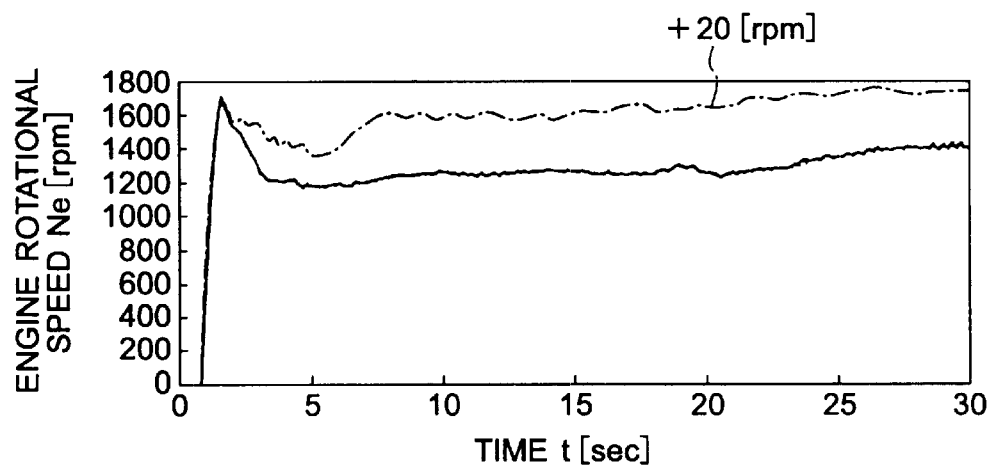
FIG. 5 is a diagram illustrating a change in the rotational speed of the engine at the start with the lapse of time in connection with the embodiment 1 of the present invention.
Figure 6:
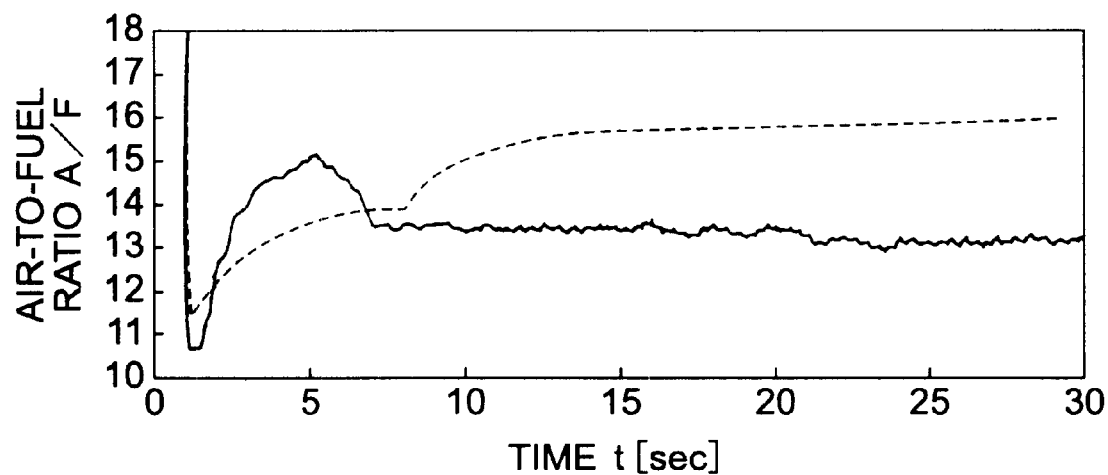
FIG. 6 is a diagram illustrating a change in the air-to-fuel ratio at the start with the lapse of time in connection with the embodiment 1 of the present invention.
Figure 7:
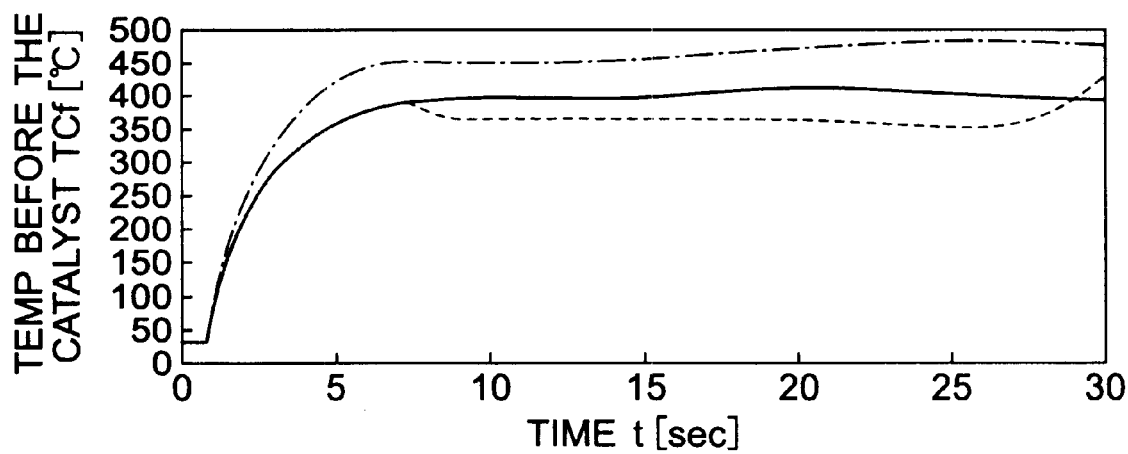
FIG. 7 is a diagram illustrating a change in the catalyst temperature on the upstream side at the start with the lapse of time in connection with the embodiment 1 of the present invention.
Figure 8:
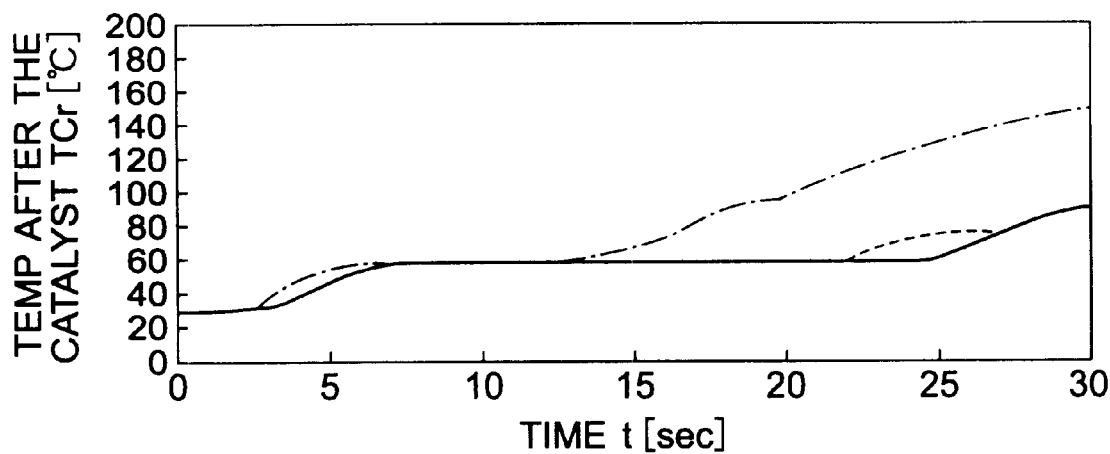
FIG. 8 is a diagram illustrating a change in the catalyst temperature on the downstream side at the start with the lapse of time in connection with the embodiment 1 of the present invention.

FIGS. 5 to 8 are diagrams illustrating changes in the conditions of the engine at the start with the lapse of time, wherein FIG. 5 shows a curve representing a change in the engine rotational speed Ne, FIG. 6 shows a curve representing a change in the air-to-fuel ratio A/F, FIG. 7 shows a curve representing a change in the temperature TCf on the upstream side of the catalyst 10, and FIG. 8 shows a curve representing a change in the temperature TCr on the downstream side of the catalyst 10.

In FIGS. 5 to 8, the abscissa represents the time t, curves of solid lines represent changes in the engine rotational speed during the normally controlled operation, and curves of dot-dash chain lines represent changes in the engine rotational speed that is increased by 200 rpm from the engine rotational speed of during the normally controlled operation. In these drawings, curves of broken lines represent changes of when the air-to-fuel ratio is forcibly corrected toward the lean side.

Figure 9:
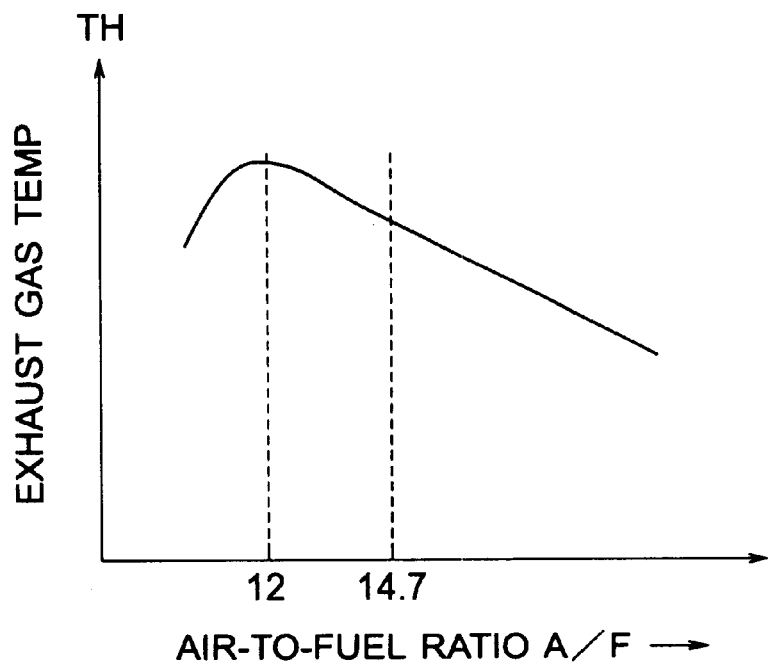
FIG. 9 is a diagram of characteristics illustrating a change in the exhaust gas temperature relative to the air-to-fuel ratio according to the embodiment 1 of the present invention.
Figure 10:
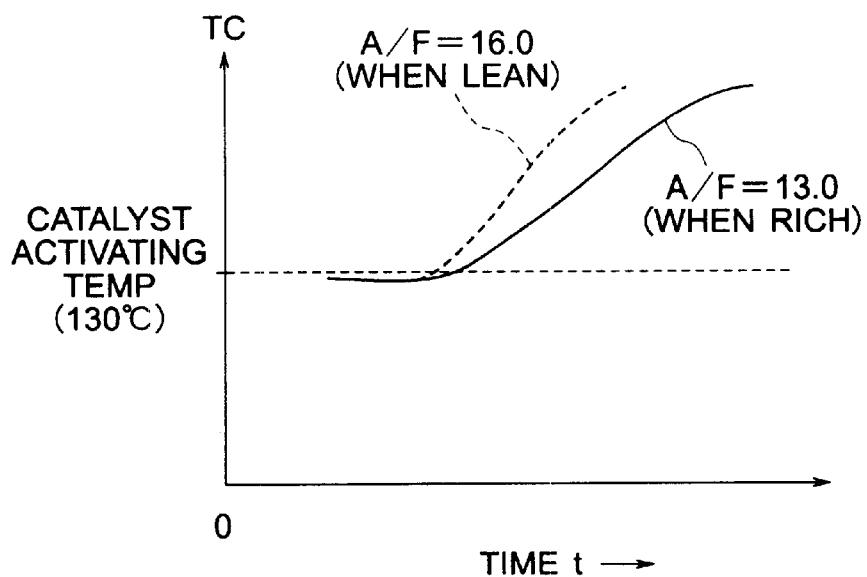
FIG. 10 is a diagram of characteristics illustrating a change in the catalyst temperature with the lapse of time according to the embodiment 1 of the present invention.

FIG. 9 is a diagram of characteristics illustrating a change in the exhaust gas temperature TH relative to the air-to-fuel ratio A/F, and FIG. 10 is a diagram of characteristics illustrating a change in the catalyst temperature TC with the lapse of time.

In FIG. 10, a curve of a solid line represents characteristics of when the air-to-fuel ratio A/F is rich (about 13.0), and a curve of a dot-dash chain line presents characteristics of when the air-to-fuel ratio A/F is lean (about 16.0).

Figure 11:
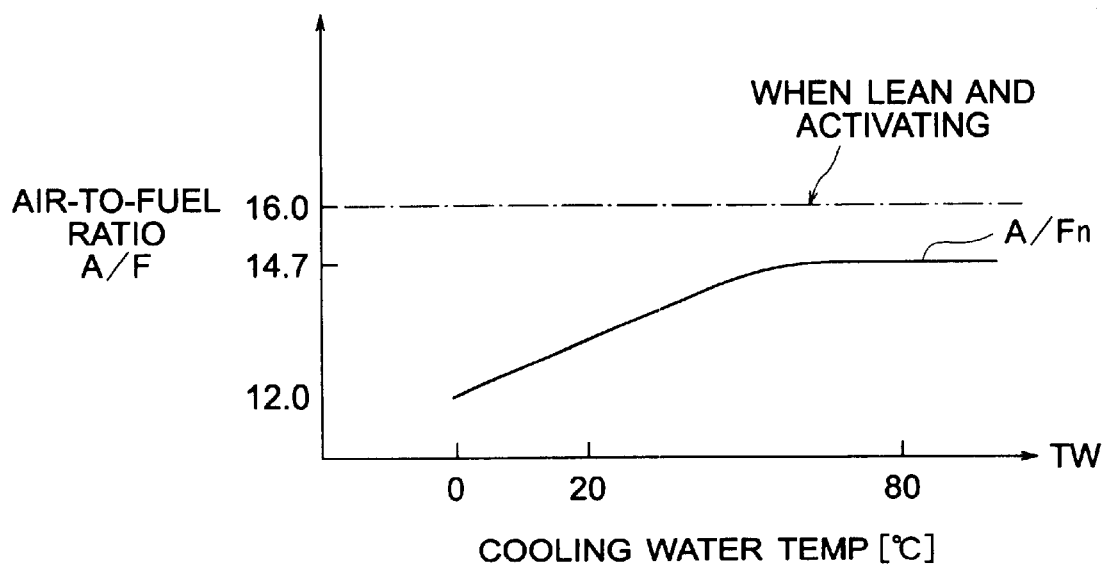
FIG. 11 is a diagram of characteristics illustrating a change in the air-to-fuel ratio relative to the cooling water temperature according to the embodiment 1 of the present invention.

FIG. 11 is a diagram of characteristics illustrating a change in the air-to-fuel ratio A/F relative to the cooling water temperature TW [° C.], wherein a curve of a solid line represents characteristics of the air-to-fuel ratio A/Fn of during the normally controlled operation, and a dot-dash chain line represents a lean activating air-to-fuel ratio A/FL (16.0 constant). The lean activating air-to-fuel ratio A/FL, however, can be variably set.

Figure 12:
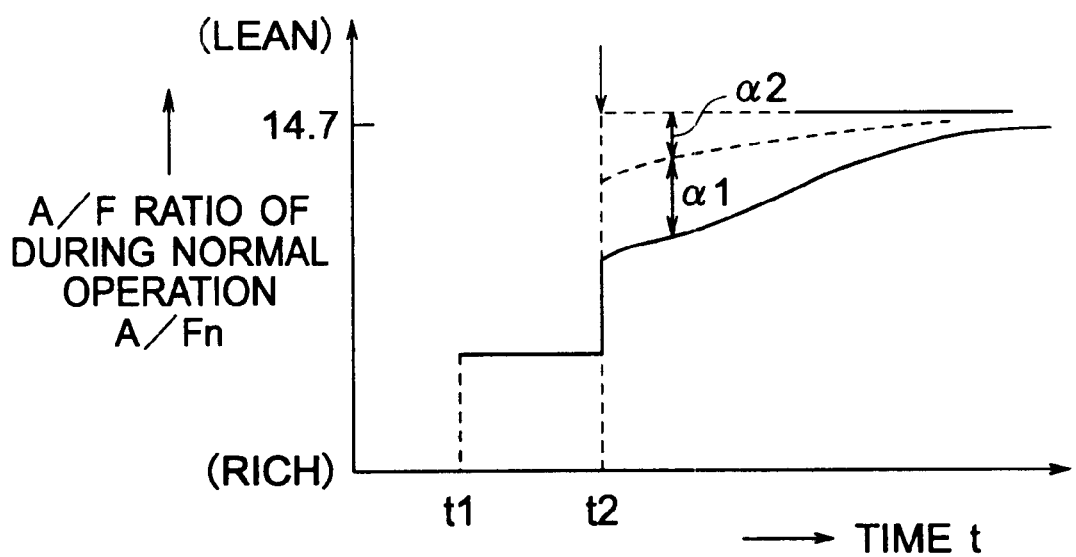
FIG. 12 is a diagram illustrating a change in the air-to-fuel ratio immediately after the start during the normally controlled operation with the lapse of time according to the embodiment 1 of the present invention.

FIG. 12 is a diagram illustrating a change in the air-to-fuel ratio A/Fn with the lapse of time immediately after the start during the normally controlled operation.

In FIG. 12, the air-to-fuel ratio A/F is set to the rich side (<14.7) during the period of from a start time t1 (time of when a starter motor is driven) to a time t2 of when the engine is really started, and is then shifted toward the lean side after the time t2 at when the engine is started.

After the start in FIG. 12, a correction amount α1 subtracted from the stoichiometric air-to-fuel ratio (=14.7) is the one for correction toward the rich side by taking into consideration the cold state of the engine 1 immediately after it is started, and a correction amount α2 is the one for correction toward the rich side for stably warming the engine 1 up. Both the correction amounts α1 and α2 decrease with the lapse of time.

Referring to FIG. 1, the ECU 14, first, compares a catalyst temperature TC detected by the temperature sensor with the first predetermined temperature T1 (e.g., about 100° C.) and judges whether the catalyst temperature TC is lower than the first predetermined temperature T1 or not (step S1).

When it is so judged that TC<T1 (i.e., YES), the catalyst temperature TC is too low and the catalyst is not almost working. Therefore, the target air-to-fuel ratio A/Fo is set to the air-to-fuel ratio A/Fn (see FIG. 12) of during the normally operated condition (step S2) to raise the temperature of combustion and, hence, to promote the activation of catalyst.

When it is judged at the step S1 that TC≧T1 (i.e., NO), the activation temperature has not been reached yet, but the catalyst is near to a level on where it works. In order to raise the catalyst reaction temperature, therefore, a first tailing processing is executed with the first air-to-fuel ratio A/F1 (corresponds to the lean activating air-to-fuel ratio A/FL) as a target value A/Fo (step S3).

In the first tailing processing (step S3), the target air-to-fuel ratio A/FO is gradually increased toward the lean activating air-to-fuel ratio A/FL (about 16.0).

That is, the first air-to-fuel ratio A/F1 is not readily set to the lean activating air-to-fuel ratio A/FL, but is gradually increased from the air-to-fuel ratio A/Fn of during the normally controlled operation toward the lean activating air-to-fuel ratio A/FL as shown in FIG. 2 (which will be described later), so that the feeling of driving will not be deteriorated.

Then, the ECU 14 compares the catalyst temperature TC with the second predetermined temperature T2 (>T1) corresponding to the activating temperature (about 180° C.) and judges whether the catalyst temperature TC is higher than the second predetermined temperature T2 (whether the catalyst temperature TC has reached the activating temperature) or not (step S4).

When it is so judged that TC2>T2 (i.e., YES), it is so regarded that the catalyst is activated to a sufficient degree, and a second tailing processing is executed with the second air-to-fuel ratio A/F2 (corresponds to the air-to-fuel ratio A/Fn of during the normally controlled operation) as a target value A/Fo (step S5), and the processing routine of FIG. 1 returns.

In the second tailing processing (step S5), the second air-to-fuel ratio A/F2 is not readily set to the air-to-fuel ratio A/Fn (rich side of smaller than 14.7) of during the normally controlled operation, but is gradually decreased from the second air-to-fuel ratio A/F2 (lean activating air-to-fuel ratio A/FL) to the air-to-fuel ratio A/Fn of during the normally controlled operation as shown in FIG. 3 (which will be described later), so that the feeling of driving will not be deteriorated.

On the other hand, when it is judged at the step S4 that TC≦T2 (i.e., NO), the processing routine of FIG. 1 returns without executing the step S5.

Within the range T1≦TC≦T2, therefore, the target air-to-fuel ratio A/Fo is set to the lean activating air-to-fuel ratio A/FL (first air-to-fuel ratio A/F1) which is larger than the stoichiometric air-to-fuel ratio.

The first predetermined temperature T1 was set to be lower than the activation starting temperature. The first predetermined temperature T1, however, may be set to a temperature (about 140° C.) higher than the activation starting temperature.

Concretely, the first tailing processing (step S3) in FIG. 1 is executed as shown in FIG. 2.

In FIG. 2, the tailing means judges whether the timing is a predetermined timing for executing the step S3 or not (step S11).

The predetermined timing for executing the step S11 is set after every predetermined period of, for example, 100 milliseconds or in synchronism with every ignition timing.

When it is determined that the timing is not a predetermined timing (i.e., NO), the processing routine of FIG. 2 returns. When the timing is juged to be the predetermined timing (i.e., YES), the first air-to-fuel ratio A/F1 is gradually increased by a minimum value selection processing (step S12), and the processing routine of FIG. 2 returns.

In the minimum value selection processing (step S12), a value of the rich side (minimum value min) of either a value (=A/F1(n−1)+ΔF1) obtained by adding a predetermined value ΔF1 to the first air-to-fuel ratio A/F1(n−1) of the previous time or the lean activating air-to-fuel ratio A/FL (e.g., 16.0) whichever is smaller, is set as the first air-to-fuel ratio A/F1 of this time.

That is, immediately after the catalyst temperature TC has exceeded the first predetermined temperature T1, the initial value of the first air-to-fuel ratio A/F1 is set to a value smaller than the air-to-fuel ratio A/Fn of during the normally controlled operation (smaller than the lean activating air-to-fuel ratio A/FL). Therefore, the value obtained by adding the predetermined value ΔF1 to the value A/F1(n−1) of the previous time becomes a minimum value min and is set as the first air-to-fuel ratio A/F1 of this time.

Thereafter, the first air-to-fuel ratio A/F1 is gradually corrected toward the lean side (increased) by the addition of a predetermined value ΔF1 for every execution of the step S12, and is clipped to the lean activating air-to-fuel ratio A/FL at a moment whe n the lean activating air-to-fuel ratio A/FL is reached.

Here, the predetermined value ΔF1 may be set to infinity to quicken the correction toward the lean side.

In the foregoing was described the case where the initial value of the first air-to-fuel ratio A/F1 was set to be smaller than the air-to-fuel ratio A/Fn of during the normally controlled operation (set to the rich side). The initial value of the first air-to-fuel ratio A/F1, however, may be set to be the same as the air-to-fuel ratio A/Fn of during the normally control led operation.

On the other hand, the second tailing processing (step S5) in FIG. 1 is executed as shown in FIG. 3.

In FIG. 3, the tailing means, first, judges whether the timing is a predetermined timing for executing the step S5 (step S11A) like at the above-mentioned step S11.

When it is judged that the timing is not the predetermined timing (i.e., NO), the processing routine of FIG. 3 returns. When it is judged that the timing is the predetermined timing (i.e., YES), the second air-to-fuel ratio A/F2 is gradually decreased by a maximum value selection processing (step S12A), and the processing routine of FIG. 3 returns.

In the maximum value selection processing (step S12A), a value of the lean side (maximum value max) of either a value (=A/F2(n−1)−ΔF2) obtained by subtracting a predetermined value ΔF2 from the second air-to-fuel ratio A/F2 (n−1) of the previous time or the air-to-fuel ratio A/Fn of during the normally controlled operation whichever is laser, is set as the second air-to-fuel ratio A/F2.

That is, immediately after the catalyst temperature TC has reached the second predetermined temperature T2, the initial value of the second air-to-fuel ratio is in agreement with the lean activating air-to-fuel ratio A/FL (larger than the air-to-fuel ratio A/Fn of during the normally controlled operation). Therefore, a value obtained by subtracting the predetermined value ΔF2 from the value of the previous time becomes a maximum value max and is set as the second air-to-fuel ratio A/F2 of this time.

Thereafter, the second air-to-fuel ratio A/F2 is gradually corrected toward the rich side (decreased) by the subtraction of a predetermined value ΔF2 for every execution of the step S12A, and is clipped to the air-to-fuel ratio A/Fn of during the normally controlled operation at a moment when it has decreased to the air-to-fuel ratio A/Fn of during the normally controlled operation.

The first predetermined temperature T1 corresponding to the activation starting temperature (130° C.) of the catalyst is variably set depending upon the catalyst and the structure of the exhaust system.

When the oxidation reaction is to be reliably executed in a lean state at a temperature in excess of the activation start temperature of the catalyst, the second predetermined temperature T2 is set to a value (about 140° C. to about 150° C.) obtained by adding a predetermined margin temperature (10° C. to 20° C.) to the activating temperature.

In this case, the control period is started with the lean activating air-to-fuel ratio A/FL at a temperature higher than the activating temperature (or near the activating temperature). Therefore, even when the temperature of the exhaust system is raised in a delayed manner, the catalyst can be heated to a sufficient degree by the temperature of the oxidation reaction.

Furthermore, after the catalyst temperature TC has reliably reached the activating temperature (temperature capable of promoting the temperature elevation owing to the oxidation reaction), the air-to-fuel ratio A/Fn of during the normally controlled operation can be resumed by the second tailing processing (step S12A).

When the oxidation reaction takes place at the time when the activation starting temperature is reached, furthermore, the first predetermined temperature T1 can be set to a value (about 100° C. to about 120° C.) obtained by subtracting a predetermined margin temperature (10° C. to 30° C.) from the catalyst activation temperature provided the exhaust system has a relatively small heat capacity CE.

In this case, the air-to-fuel ratio A/Fn can be controlled to a lean ratio at a relatively early timing of before the catalyst is activated. Therefore, the control operation is not wastefully continued maintaining the lean activating air-to-fuel ratio A/FL, and the oxidation reaction is reliably executed just before the catalyst is activated (or just when the catalyst is activated), enabling the temperature of the catalyst to be effectively raised.

In the foregoing was described the case where the initial value of the second air-to-fuel ratio A/F2 was set to the lean activating air-to-fuel ratio A/FL. However, the initial value of the second air-to-fuel ratio A/F2 may be set to a value larger than the lean activating air-to-fuel ratio A/FL (may be set on the lean side).

Upon controlling the air-to-fuel ratio A/Fn (see FIG. 12) at the start, furthermore, the real air-to-fuel ratio A/F is corrected toward the rich side from that of during the normally controlled operation (solid line) at the early stage of the start as represented by a broken line in FIG. 6 and is, then, corrected toward the lean side (14.7 or larger).

The temperature TCf on the upstream side of the catalyst 10 is lowered from the temperature of during the normally controlled operation as the air-to-fuel ratio A/F becomes lean as represented by a broken line in FIG. 7.

Referring to FIG. 8, on the other hand, the temperature TCr on the downstream side of the catalyst 10 gradually rises after it has remained constant over a period corresponding to the heat capacity CE of the exhaust system (for 18 seconds of from 7 seconds to 25 seconds when the engine is running under the normal condition (solid line), or for 8 seconds of from 7 seconds to 15 seconds when the engine is running under the condition for correction toward the increasing side (dot-dash chain line).

FIG. 9 illustrates a change in the exhaust gas temperature TH relative to the air-to-fuel ratio A/F, wherein the exhaust gas temperature TH becomes a maximum when the air-to-fuel ratio A/F is about 12.0 which is more rich than the stoichiometric air-to-fuel ratio (14.7). Therefore, the exhaust gas temperature TH gradually decreases as the air-to-fuel ratio A/F increases (becomes lean) beyond 12.0.

When the air-to-fuel ratio A/F becomes lean, oxygen is contained in large amounts in the exhaust gases. Therefore, HC and CO in the exhaust gases undergo the oxidation reaction in the catalyst to generate heat in large amounts.

After the catalyst temperature TC has reached the activation temperature (=130° C.), therefore, the catalyst temperature TC rises more quickly in the lean condition (see a dot-dash chain line) than in the rich condition (see a solid line) as shown in FIG. 10.

Thus, the target air-to-fuel ratio A/Fo is corrected toward the lean side depending upon the catalyst temperature TC, is corrected to become more lean than the air-to-fuel ratio A/Fn of during the normally controlled operation based on the operation conditions within a range in which a minimum of output torque can be maintained, and is corrected to become at least more lean than th e stoichiometric air-to-fuel ratio.

As a result as shown in FIG. 10, the temperature rise can be promoted by promoting the oxidation reaction of HC and Co in the catalyst around the catalyst activation temperature. This makes it possible to promote the activation of the catalyst at an early time.

Embodiment 2

In the above-mentioned embodiment 1, the catalyst temperature TC was directly detected. The catalyst temperature TC, however, may be estimated based on the data (operation conditions) from other various sensors.

Described below is the embodiment 2 of the present invention in which the catalyst temperature TC is estimated from the exhaust gas temperature TH.

The basic constitution o f the embodiment 2 of the present invention is the same as the one described above, but the operation program in the ECU 14 is partly different from that of the above-mentioned embodiment 1.

In this case, the catalyst temperature pick-up means is constituted by an exhaust gas sensor (not shown) provided in the exhaust pipe 3 to detect the exhaust gas temperature TH, and a catalyst temperature estimating means provided in the ECU 14 to estimate the catalyst temperature TC from the exhaust gas temperature TH.

A variety of sensors include an intake-air-temperature sensor for detecting the temperature TA of the air taken in and a water temperature sensor (not shown) for detecting the temperature TW of the cooling water, in addition to the exhaust-gas-temperature sensor.

The ECU 14 further includes an initial temperature estimating means for estimating the initial temperature of the catalyst (catalyst temperature at the start) TCs from the water temperature TW of the engine 1 at the start and from the temperature TAs of the air taken in at the start, in addition to the catalyst temperature estimating means.

The rise of the catalyst temperature TC varies depending not only upon the exhaust gas temperature TH but also upon the amount of heat energy absorbed by the exhaust system when the exhaust system has a large heat capacity. In estimating the catalyst temperature TC, therefore, the temperature TE of the exhaust system must be taken into consideration.

When the water temperature TWs at the start and the temperature TAs of the air taken in at the start are nearly equal to each other, the initial temperature estimating means in the ECU 14 estimates the water temperature TWs at the start as the initial catalyst temperature TCS and as the initial temperature TEs of the exhaust system (temperature of the exhaust system at start).

When the water temperature TWs at the start and the temperature TAs of the air taken in at the start are not the same, the initial temperature estimating means estimates the initial catalyst temperature TCs and the initial temperature TEs of the exhaust system based on a deviation ΔTs between the water temperature TWs at the start and the temperature TAs of the air taken in at the start.

Next, the operation of the embodiment 2 of the present invention will be described with reference to FIGS. 13 to 19 together with FIGS. 38 and 39.

Figure 13:
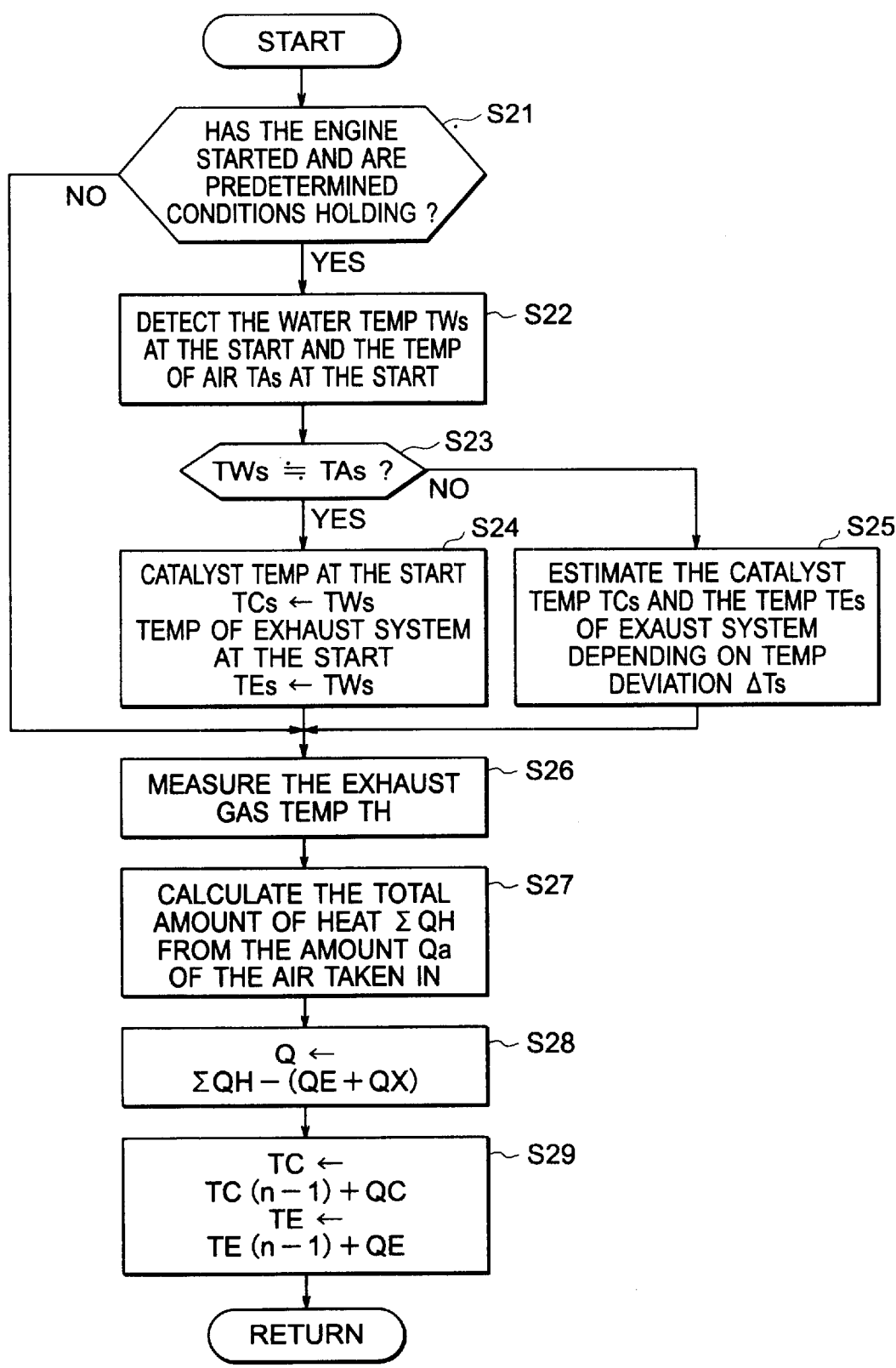
FIG. 13 is a flow chart illustrating the operation for estimating the catalyst temperature according to an embodiment 2 of the present invention.

FIG. 13 is a flow chart illustrating the operation for estimating the catalyst temperature according to the embodiment 2 of the present invention.

Figure 14:
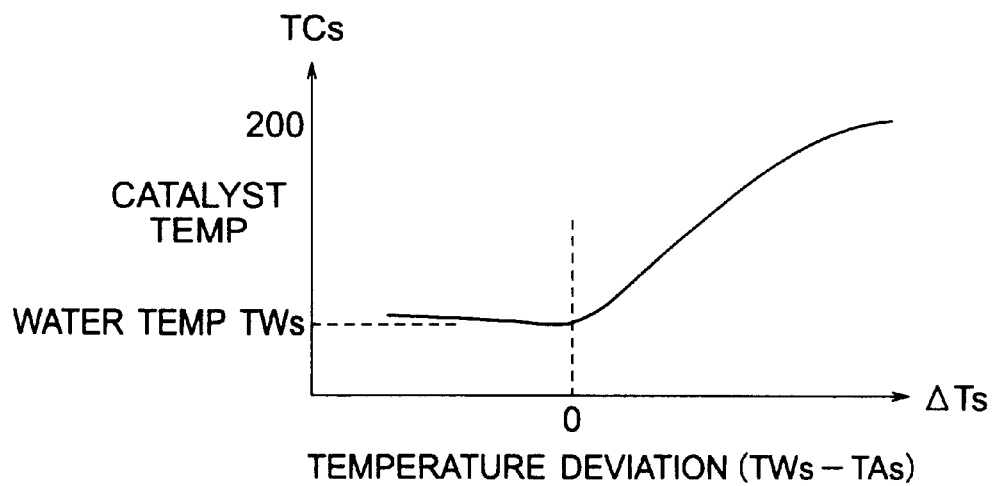
FIG. 14 is a diagram illustrating estimated initial catalyst temperatures according to the embodiment 2 of the present invention.

FIG. 14 is a diagram illustrating the processing (steps S23 to S25) for estimating the initial catalyst temperature TCs in FIG. 13.

In FIG. 14, the abscissa represents the temperature deviation ΔTs (=TWs−TAs) between the cooling water temperature TWs and the temperature TAs of the air taken in at the start of the engine 1.

Figure 15:
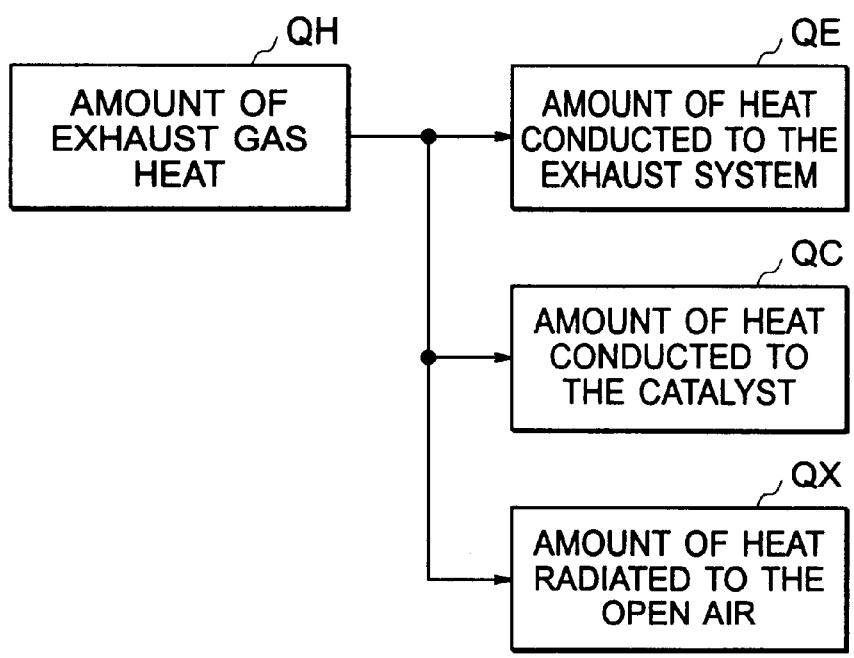
FIG. 15 is a diagram illustrating a state where the heat energy (amount of exhaust gas heat) of the exhaust gases is consumed in relation to the embodiment 2 of the present invention.

FIG. 15 is a diagram illustrating a state where the heat energy (amount of exhaust gas heat) of exhaust gases is consumed, and wherein the amount QH of exhaust gas heat of exhaust gases is consumed being divided into an amount QE of heat conducted to the exhaust system, an amount QC of heat conducted to the catalyst and an amount QX of heat radiated to the open air.

The amount QE of heat conducted to the exhaust system is determined by a heat capacity CE of the exhaust system and a heat resistance RE, the amount QC of heat conducted to the catalyst is determined by a heat capacity CC of the catalyst and a heat resistance RC, and the amount QX of heat radiated to the open air is determined by a heat resistance RX of the open air.

Figure 16:
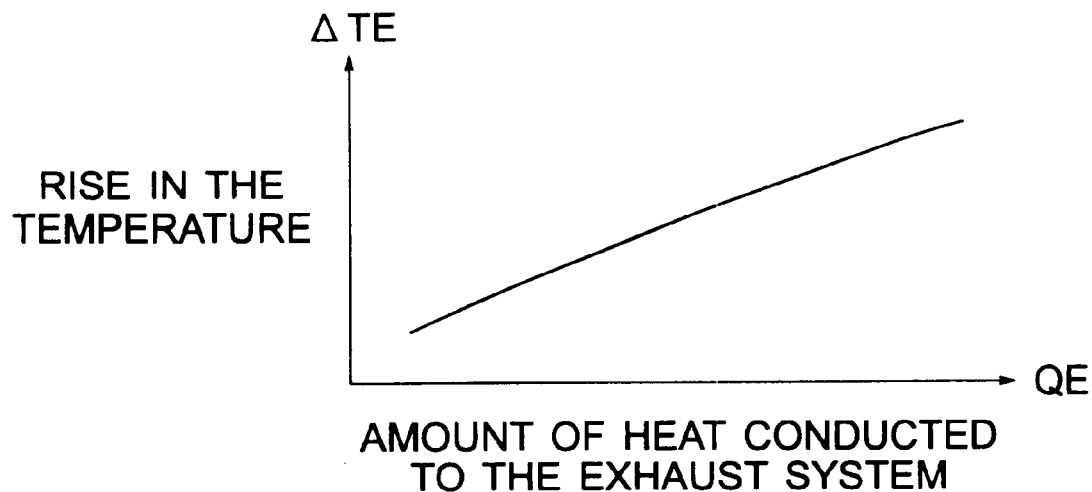
FIG. 16 is a diagram of characteristics illustrating a relationship between the amount of heat conducted to the exhaust system and the rise in the temperature of the exhaust system in relation to the embodiment 2 of the present invention.
Figure 17:
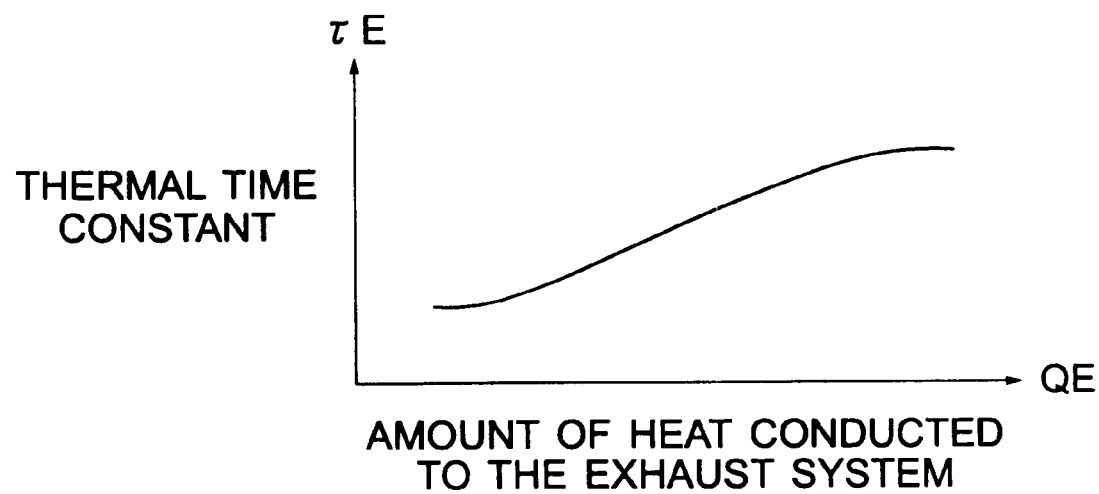
FIG. 17 is a diagram of characteristics illustrating a relationship between the amount of heat conducted to the exhaust system and the thermal time constant of the exhaust system in relation to the embodiment 2 of the present invention.

FIG. 16 is a diagram of characteristics illustrating a relationship between the amount QE of heat conducted to the exhaust system and the rise in the temperature ΔTE of the exhaust system, and FIG. 17 is a diagram of characteristics illustrating a relationship between the amount QE of heat conducted to the exhaust system and the thermal time constant τE of the exhaust system.

In FIG. 16, the total amount of heat ΣQE conducted to the exhaust system can be regarded to be equivalent to the temperature TE of the exhaust system. By using the rise in the temperature ΔTE, therefore, the temperature TE of the exhaust system can be given by the following formula (1), $$TE = TE(n-1) + \Delta TE \qquad (1)$$

where TE(n−1) is the temperature TE of the exhaust system of the previous time.

Similarly, by using the thermal time constant τE which serves as a filter coefficient in FIG. 17, the temperature TE of the exhaust system corresponding to the total amount ΣQE of heat conducted to the exhaust system is given by the following formula (2), $$TE = TE(n-1) \times (1-\tau E) + QE \times \beta E \times \tau E \qquad (2)$$

where βE is the specific heat of the exhaust system.

By using the above-mentioned formulas (1) and (2), the temperatures TE of the exhaust system (total amounts ΣQE of heat conducted to the exhaust system) are calculated to be nearly in agreement with each other.

Figure 18:
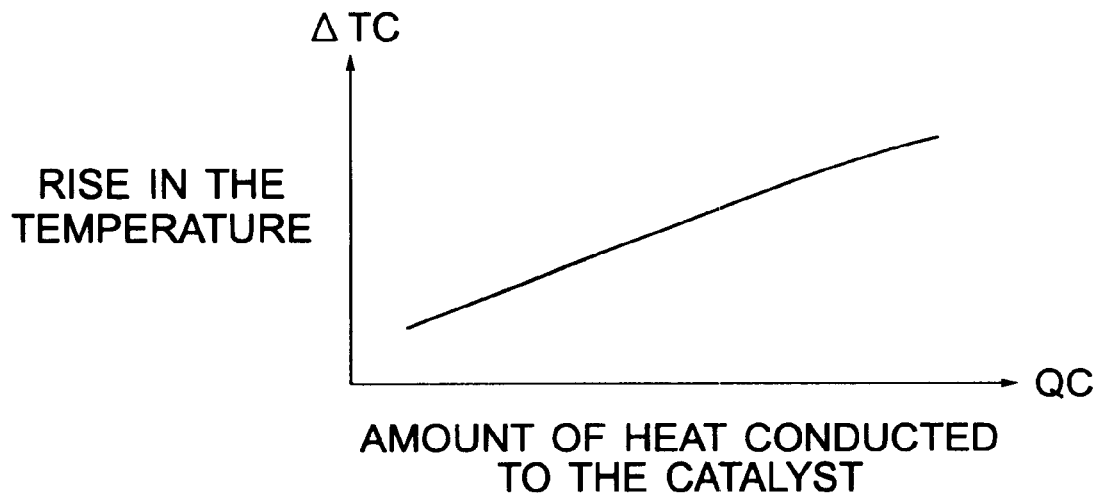
FIG. 18 is a diagram of characteristics illustrating a relationship between the amount of heat conducted to the catalyst and the rise in the temperature of the catalyst in relation to the embodiment 2 of the present invention.
Figure 19:
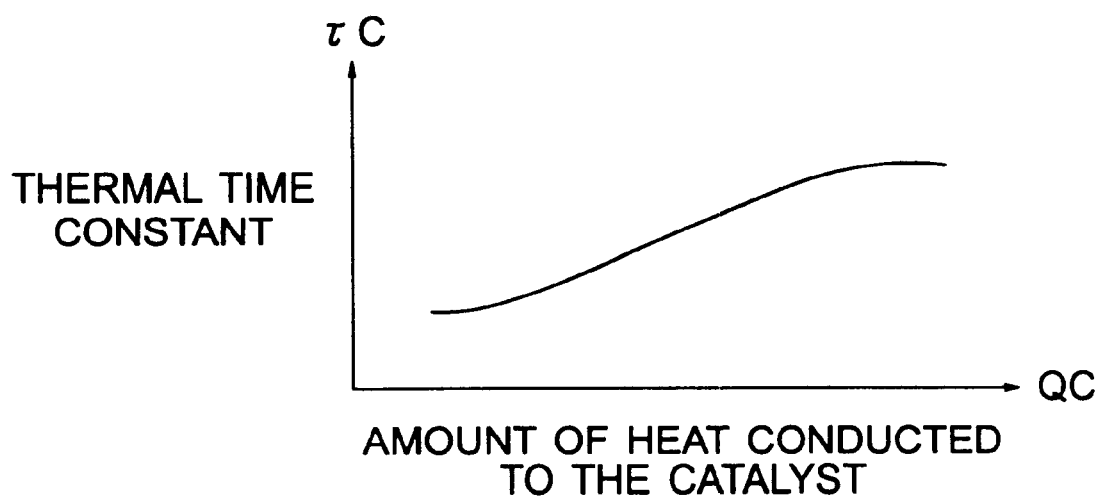
FIG. 19 is a diagram of characteristics illustrating a relationship between the amount of heat conducted to the catalyst and the thermal time constant of the catalyst in relation to the embodiment 2 of the present invention.

FIG. 18 is a diagram of characteristics illustrating a relationship between the amount of heat QC conducted to the catalyst and the rise in the temperature ΔTC of the catalyst, and FIG. 19 is a diagram of characteristics illustrating a relationship between the amount of heat QC conducted to the catalyst and the thermal time constant τC of the catalyst.

By using the rise in the temperature ΔTC in FIG. 18, the catalyst temperature TC corresponding to the total amount of heat ΣQC conducted to the catalyst is given by the following formula (3), $$TC = TC(n-1) + \Delta TC \qquad (3)$$

where TC(n−1) is the catalyst temperature TC of the previous time.

Similarly, by using the thermal constant τC in FIG. 19, the catalyst temperature TC corresponding to the total amount of heat ΣQC conducted to the catalyst is given by the following formula (4), $$TC = TC(n-1) \times (1-\tau C) + QC \times \beta C \times \tau C \qquad (4)$$

where βC is the specific heat of the catalyst.

By using the above-mentioned formulas (3) and (4), it will be understood that the catalyst temperatures TC (total amounts of heat ΣQC conducted to the catalyst) are calculated to be nearly in agreement with each other.

In FIG. 13, the ECU 14, first, judges whether the engine 1 has started and the predetermined conditions are holding or not (step S21). Here, as the predetermined conditions, it is judged whether a predetermined period of time has passed from the start of the engine 1 and whether the timing for executing a predetermined operation has been reached or not.

When it is judged at a step S21 that the predetermined conditions are holding after the start of the engine (i.e., YES), the water temperature TWs at the start and the temperature TAs of the air taken in at the start are detected by the water temperature sensor and the intake-air-temperature sensor (step S22).

Here, in order to remove dispersion in the detected value, the water temperature TWs at the start and the temperature TAs of the air taken in at the start may be detected over a predetermined period of time, and the detected values may be averaged.

Then, the water temperature TWs at the start and the temperature TAs of the air taken in at the start are compared with each other to judge whether they are nearly equal to each other or not (step S23).

When there is almost no difference between the water temperature TWs at the start and the temperature TAs of the air taken in at the start, it is so regarded that the vehicle was left to stand until the water temperature became in agreement with the temperature of the open air. The temperature at this moment can be presumed to be the initial catalyst temperature TCs.

Therefore, when it is judged at the step S23 that TWs TAs (i.e., YES), the state is regarded to be the initial state where there is no rise in the temperature of the engine 1, and the catalyst temperature TCs and the temperature TEs (initial value) of the exhaust system at the start are set to a value same as the water temperature TWs at the start (step S24).

At the step S23, furthermore, when it is judged that the deviation ΔTs between the water temperature TWs at the start and the temperature TAs of the air taken in at the start is larger than a predetermined value and that TWs≠TAs (i.e., NO), then, it is regarded that the condition is an operation condition where the temperature of the engine 1 is greatly rising, and the catalyst temperature TC and the temperature TE (estimated value) of the exhaust system are set depending upon the temperature deviation ΔTs (step S25).

At this moment, the initial catalyst temperature TCs is estimated depending upon the temperature deviation ΔTs as shown in FIG. 14.

That is, when the temperature deviation ΔTs is 0 or smaller, the catalyst temperature TCs is set to the water temperature TWs at the start. As the temperature deviation ΔTs becomes larger than 0, it is so regarded that the catalyst is becoming active, and the catalyst temperature TCs is set to a large value.

Then, the exhaust-gas-temperature sensor measures the temperature TH of exhaust gases (step S26), and the total amount of heat ΣQH of exhaust gases is calculated by using the exhaust gas temperature TH, catalyst temperature TCs and the amount of the air Qa taken in measured by the air flow sensor 5, in compliance with the following formula (5) (step S27), $$\Sigma QH = (TH - TCs) \times Qa \times \beta H \qquad (5)$$

where βH is the specific heat of the exhaust gases.

When it is judged at the step S21 that the predetermined conditions do not hold after the start of the engine (i.e., NO), the condition is no longer regarded to be at the start of the engine. Therefore, the routine proceeds to a step S26 without executing the steps S22 to S25.

Next, the amount of heat QE conducted to the exhaust system and the amount of heat QX radiated to the open air are subtracted from the total amount of heat ΣQH calculated from the formula (5), and the amount of heat QC conducted to the catalyst is calculated according to the following formula (6) (step S28), $$QC = \Sigma QH - (QE + QX) \quad (6)$$

Finally, relying upon the estimation by using the amount of heat QC conducted to the catalyst and the amount of heat QE conducted to the exhaust system, the catalyst temperature TC and the temperature TE of the exhaust system are calculated according to the following formulas (7) and (8), and the processing routine of FIG. 13 returns.

$$TC = TC(n-1) + QC \quad (7)$$

$$TE = TE(n-1) + QE \quad (8)$$

where TC(n−1) and TE(n−1) are the catalyst temperature TC and the temperature TE of the exhaust system of the previous time, respectively.

Thus, the catalyst temperature TC is estimated from the exhaust gas temperature TH detected by the exhaust gas sensor, exhibiting the action and effect same as those described above.

As described above, the total amount of heat ΣQH that is generated is calculated from the air-to-fuel ratio and the amount Qa of the air taken in, and the catalyst temperature TC is estimated from the total amount of heat ΣQH by taking the heat capacity CE of the exhaust system into consideration.

Embodiment 3

In the above-mentioned embodiment 2, the catalyst temperature TC was estimated by practically detecting the exhaust gas temperature TH. It is, however, also allowable to estimate the exhaust gas temperature TH and the catalyst temperature TC based on the data (operation conditions) from various other sensors, instead of using the exhaust-gas-temperature sensor.

Described below with reference to the drawings is an embodiment 3 of the present invention without using the exhaust-gas-temperature sensor.

In this case, the ECU 14 includes a catalyst temperature estimating means as a catalyst temperature pick-up means, and estimates the catalyst temperature TC based on the data of various other sensors inclusive of at least the amount Qa of the air taken in.

Figure 20:
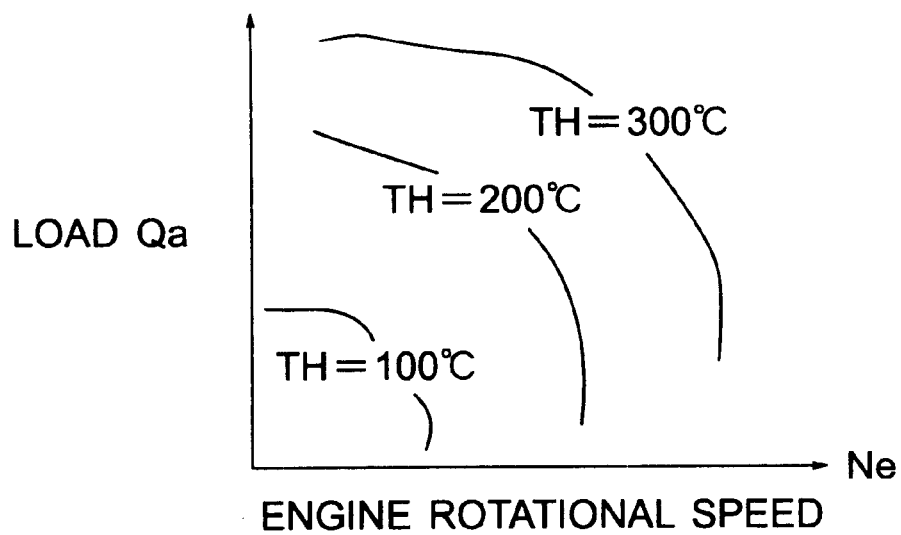
FIG. 20 is a diagram illustrating the operation for estimating the exhaust gas temperature according to an embodiment 3 of the present invention.
Figure 21:
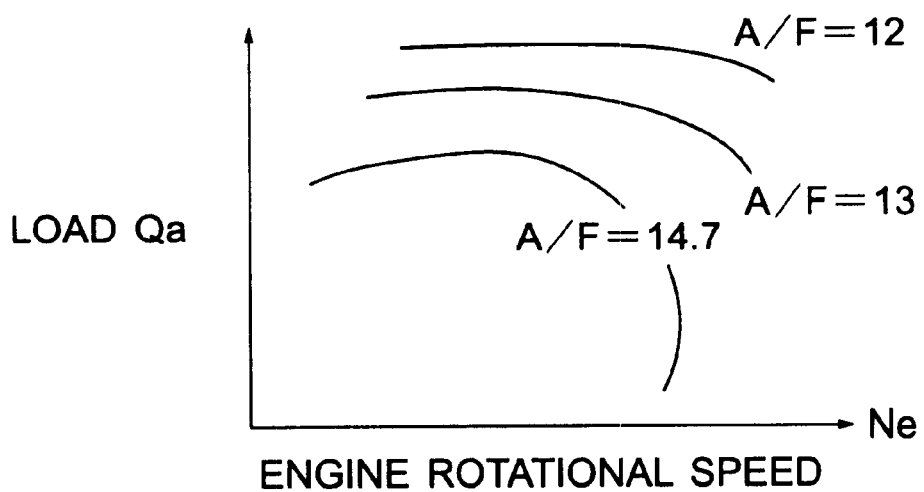
FIG. 21 is a diagram illustrating the operation for setting the air-to-fuel ratio according to the embodiment 3 of the present invention.

FIG. 20 is a diagram illustrating the operation for estimating the exhaust gas temperature TH according to an embodiment 3 of the present invention, and FIG. 21 is a diagram illustrating the operation for setting the air-to-fuel ratio A/F according to the embodiment 3 of the present invention.

In FIG. 20, the exhaust gas temperature TH is estimated based on a two-dimensional map of the engine rotational speed Ne and the engine load (amount Qa of the air taken in).

That is, the exhaust gas temperature TH is set to a large value when at least either the engine rotational speed Ne or the engine load (amount Qa of the air taken in) included in the data (operation conditions) from various sensors increases.

In FIG. 21, the air-to-fuel ratio A/F is determined based on a two-dimensional map of the engine rotational speed Ne and the engine load (amount Qa of the air taken in) like in the case of the exhaust gas temperature TH.

Here, however, the air-to-fuel ratio A/F varies depending upon the cooling water temperature TW as described above (see FIGS. 11 and 12).

It is therefore made possible to correct the air-to-fuel ratio A/F toward the lean side in response to the catalyst activating temperature in the same manner as described above.

The basic exhaust gas temperature TH is determined in a manner as shown in FIG. 20. In the cold state, however, the air-to-fuel ratio A/F varies depending upon the water temperature TW. Therefore, a more correct exhaust gas temperature TH is estimated based on the operation conditions (amount Qa of the air taken in, the engine rotational speed Ne) and the air-to-fuel ratio A/F.

As described above, the catalyst temperature TC can be estimated based on the exhaust gas temperature TH found from the two-dimensional map of FIG. 20.

Here, the exhaust gas temperature TH and the catalyst temperature TC were estimated relying only upon the engine load (amount Qa of the air taken in). The catalyst temperature TC, however, can be estimated more concretely if other data such as air-to-fuel ratio A/F and the like are taken into consideration.

Furthermore, the catalyst temperature estimating means in the ECU 14 may set the water temperature TWs at the start as the initial catalyst temperature TC as described above, and may estimate the catalyst temperature TC based on the amount of heat ΣQH generated that is calculated from the amount Qa of the air taken in and the heat capacity CE of the exhaust system.

Furthermore, the catalyst temperature estimating means may include an initial temperature estimating means for estimating the initial catalyst temperature TCs in the same manner as described above, and may estimate the initial temperature TCs of the catalyst based on at least the water temperature TWs at the start an the temperature TAs of the air taken in at the start.

That is, when the water temperature TWs at the start and the temperature TAs of the air taken in at the start are nearly equal to each other, the initial temperature estimating means estimates the water temperature TWs at the start as the initial temperature TCs of the catalyst (see step S24 in FIG. 13).

When the water temperature TWs at the start and the temperature TAs of the air taken in at the start are different by more than a predetermined temperature, the initial temperature TCs of the catalyst is estimated based on a temperature deviation ΔTs between the water temperature TWs at the start an the temperature TAs of the air taken in at the start (see step S25 in FIG. 13).

As described above, the water temperature TWs at the start is presumed to be the initial catalyst temperature TC by using at least the water temperature TWs at the start, amount Qa of the air taken in and the air-to-fuel ratio A/F, and the amount ΣQH of heat generated is found based on the air-to-fuel ratio A/F, catalyst temperature TC and amount Qa of the air taken in as described above, in order to estimate the catalyst temperature TC from the amount ΣQH of heat generated by taking the heat capacity CE of the exhaust system into consideration.

In this case, there is required no expensive catalyst temperature sensor or the exhaust-gas-temperature sensor that is designed to detect high temperatures or to detect temperatures over a wide range, and the cost of production can be decreased yet obtaining the above-mentioned effect.

Embodiment 4

In the above-mentioned embodiment 1, the target air-to-fuel ratio A/Fo was corrected toward the lean side to promote the activation of the catalyst. It is, however, also allowable to correct the target idling rotational speed Nio toward the increasing side during the idling operation.

Described below with reference to the drawings is an embodiment 4 of the present invention in which the target idling rotational speed Nio is corrected toward the increasing side.

In this case, the above-mentioned variety of sensors include a temperature sensor (catalyst temperature pick-up means) for directly detecting the catalyst temperature TC.

The ECU 14 includes an idling control means for controlling the idling rotational speed Ni by adjusting the opening degree of the ISC valve (see FIG. 38) depending upon the operation conditions, and an idling rotational speed increasing means for correcting the target idling rotational speed Nio toward the increasing side beyond the idling rotational speed Nin of during the normally controlled operation.

The idling rotational speed increasing means in the ECU 14 includes a first comparator means for comparing the catalyst temperature TC with a first predetermined temperature T1$a$ lower than the activating temperature, and a second comparator means for comparing the catalyst temperature TC with a second predetermined temperature T2$a$ which is higher than the first predetermined temperature T11$a$ and is corresponding to the activating temperature. When the catalyst temperature TC lies in a range between the first predetermined temperature T1$a$ and the second predetermined temperature T2$a$ (T1$a$≦TC≦T2$a$), the idling rotational speed increasing means sets the target idling rotational speed Nio to an increased activating rotational speed NiU higher than the idling rotational speed Nin of during the normally controlled operation for a predetermined period of time until the catalyst temperature TC reaches the activating temperature.

When the catalyst temperature TC is lower than the first predetermined temperature T1$a$ or is higher than the second predetermined temperature T2$a$, therefore, the idling control means in the ECU 14 sets the target idling rotational speed Nio to the normal value Nin.

When the catalyst temperature TC is lower than the activating temperature (T1$a$≦TC≦T2$a$), on the other hand, the target idling rotational speed Nio is set to the increased activating rotational speed NiU to raise the exhaust gas temperature and to increase the amount of oxygen in the exhaust gases, so that the catalyst temperature TC is raised and the activation of the catalyst is promoted.

Furthermore, the idling rotational speed increasing means includes a tailing means for gradually changing the target idling rotational speed Nio when the target idling rotational speed Nio is to be changed over.

That is, when the catalyst temperature TC becomes higher than the first predetermined temperature T1$a$, the tailing means in the idling rotational speed increasing means gradually increases the target idling rotational speed Nio from the idling rotational speed Nin of during the normally controlled operation up to the increased activating rotational speed NiU (=Nin+100 rpm) every time by a predetermined value ΔN1.

When the catalyst temperature TC becomes higher than the second predetermined temperature T2$a$, on the other hand, the tailing means gradually decreases the target idling rotational speed Nio from the increased activating rotational speed NiU down to the idling rotational speed Nin of during the normally controlled operation every time by a predetermined value ΔN2.

Next, the operation of the embodiment 4 of the present invention will be described with reference to FIGS. 22 to 28 together with FIGS. 38 and 39.

Figure 22:
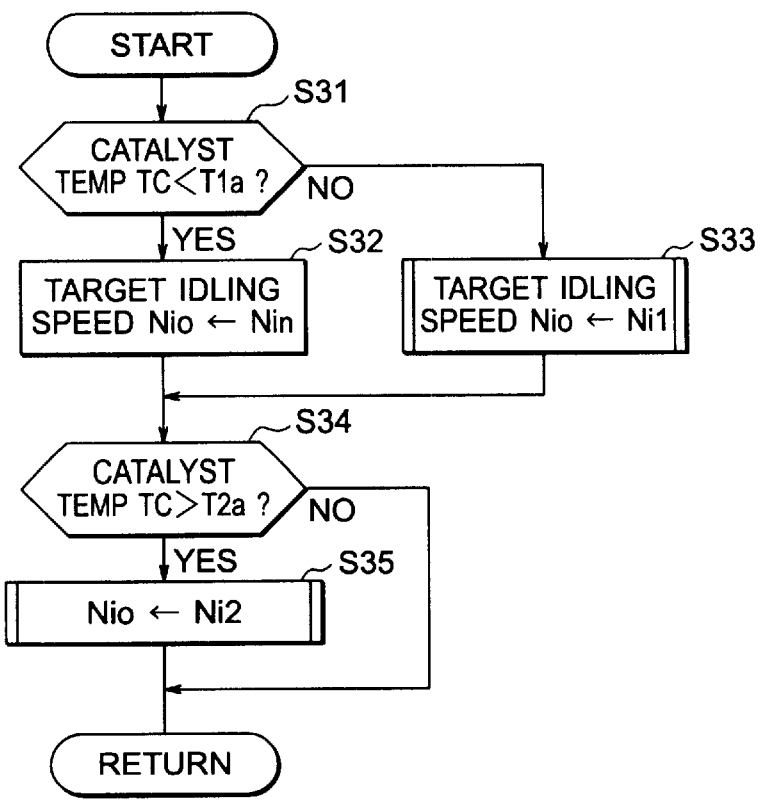
FIG. 22 is a flow chart illustrating the processing for correcting the idling rotational speed for promoting the activation of the catalyst depending upon the catalyst temperature according to an embodiment 4 of the present invention.

FIG. 22 is a flow chart illustrating a processing for correcting the idling rotational speed Ni promote the activation of the catalyst depending upon the catalyst temperature according to the embodiment 4 of the present invention.

Figure 23:
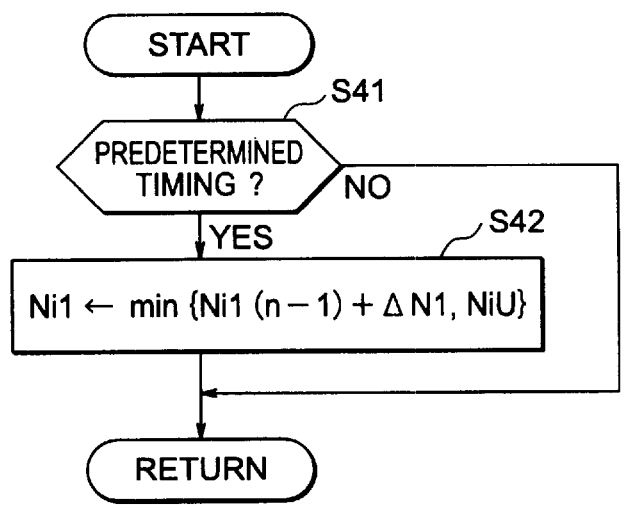
FIG. 23 is a flow chart concretely illustrating the tailing processing operation (step S33) for increasing the idling rotational speed according to the embodiment 4 of the present invention.
Figure 24:
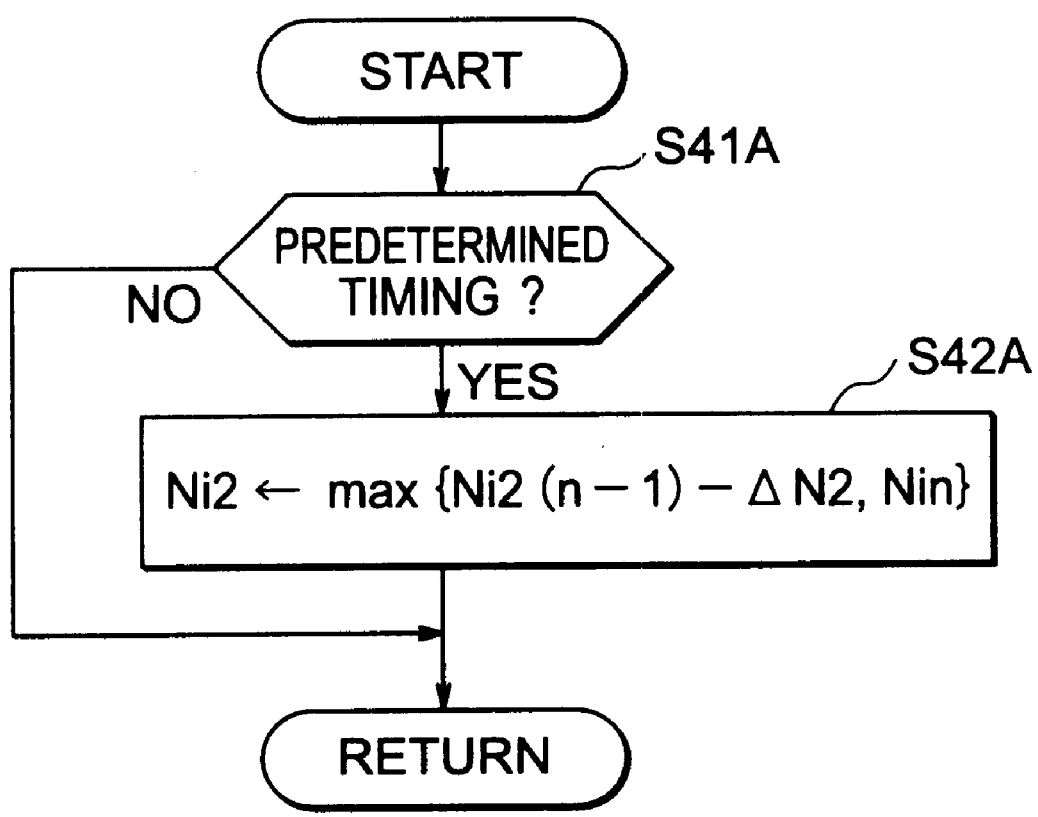
FIG. 24 is a flow chart concretely illustrating the tailing processing operation (step S35) for restoring the normal idling rotational speed according to the embodiment 4 of the present invention.

FIG. 23 is a flow chart illustrating a step S33 (first tailing processing with the first rotational speed Ni1 as a target value) in FIG. 22, and FIG. 24 is a flow chart illustrating a step S35 (second tailing processing with the second rotational speed Ni2 as a target value) in FIG. 22.

FIGS. 22 to 24 are corresponding to FIGS. 1 to 3 described earlier, and the steps S31 to S35 in FIG. 22 correspond to the steps S1 to S5 (see FIG. 1), the steps S41 and S42 in FIG. 23 correspond to the steps S11 and S12 (see FIG. 2), and the steps S41A and S42A in FIG. 24 correspond to the steps S11A and S12A (see FIG. 3).

Figure 25:
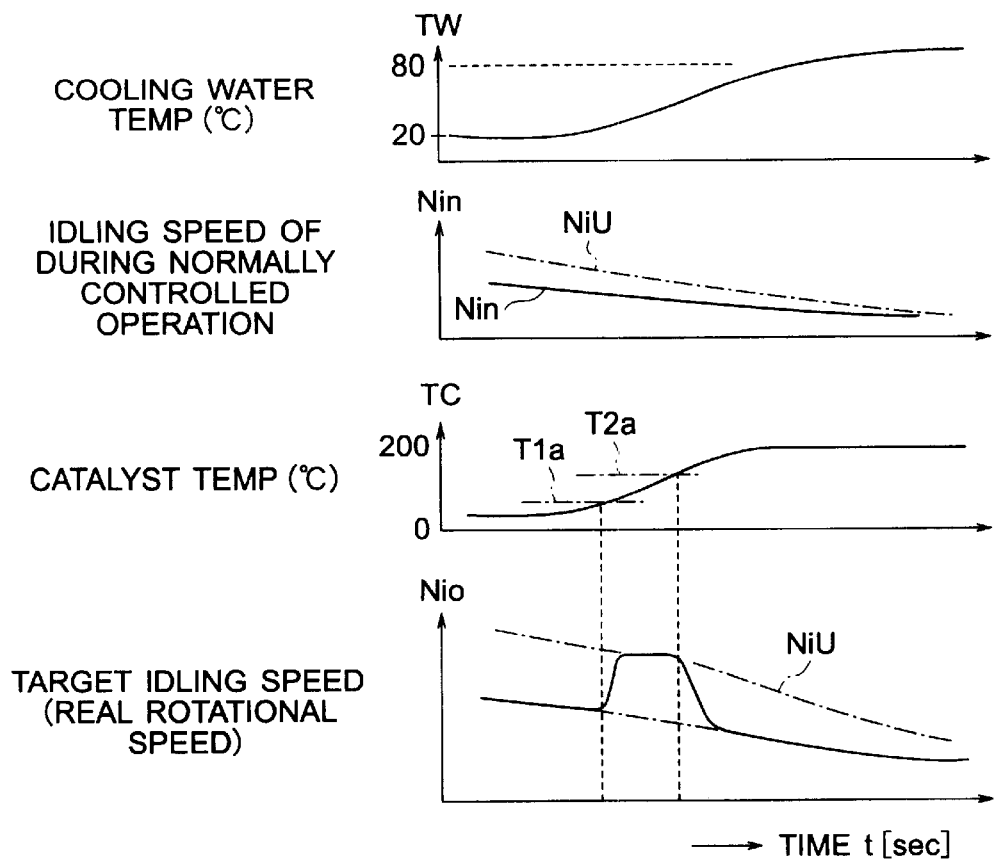
FIG. 25 is a timing chart illustrating changes in the cooling water temperature, idling rotational speed during the normally controlled operation, catalyst temperature, and target idling rotational speed according to the embodiment 4 of the present invention.

FIG. 25 is a timing chart illustrating changes in the cooling water temperature TW, idling rotational speed Nin during the normally controlled operation, catalyst temperature TC and target idling rotational speed Nio with the lapse of time, and corresponds to FIG. 4 described earlier.

In FIG. 25, the cooling water temperature TW and the catalyst temperature TC change in the same manner as described earlier (see FIG. 4).

The increased activating rotational speed NiU (see a dot-dash chain line) for promoting the activation of the catalyst is set to a value higher by, for example, about 100 rpm than the normal value Nin, and decreases with the lapse of time t.

The first and second predetermined temperatures T1$a$ and T2$a$ that serve as references for comparison with the catalyst temperature TC may be set to be the same as the above-mentioned first and second predetermined temperatures T1 and T2.

Figure 26:
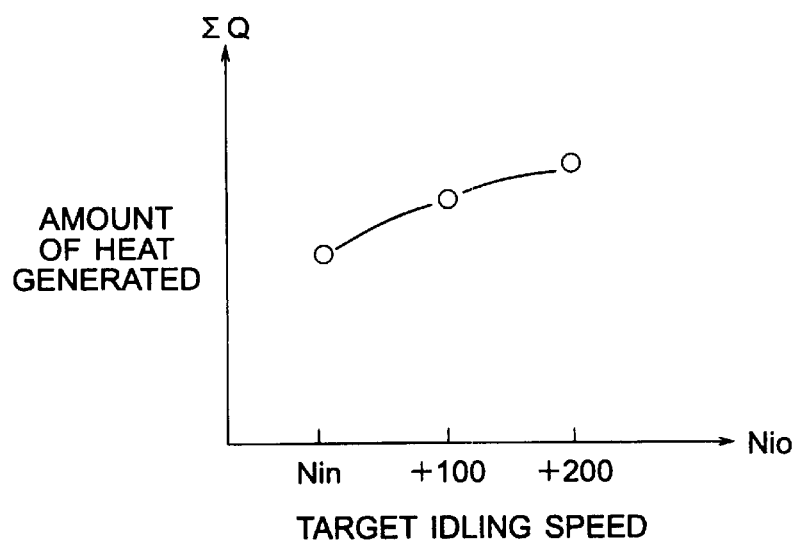
FIG. 26 is a diagram of characteristics illustrating a relationship between the target idling rotational speed and the amount of heat generated in relation to the embodiment 4 of the present invention.
Figure 27:
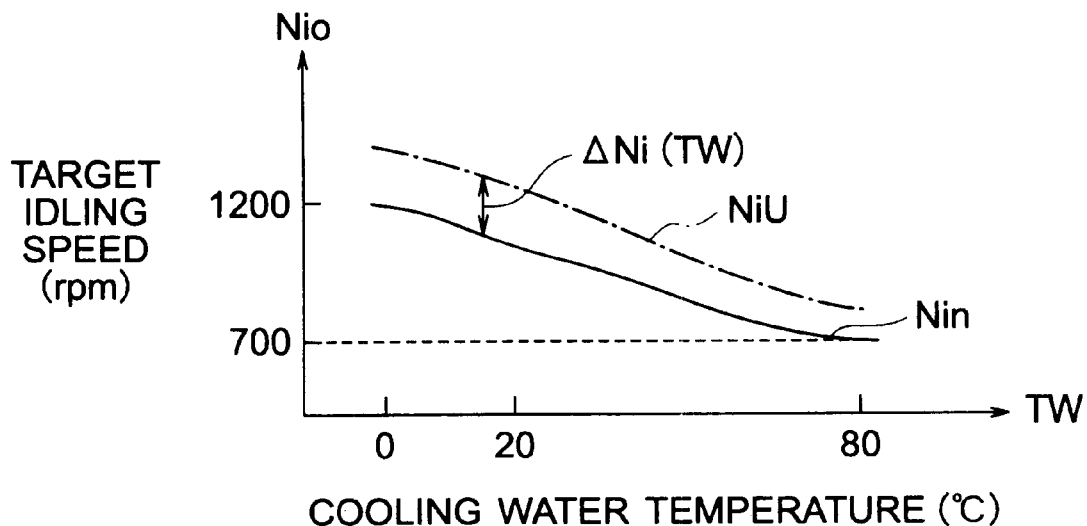
FIG. 27 is a diagram of characteristics illustrating the target idling rotational speed set depending upon the cooling water temperature according to the embodiment 4 of the present invention.
Figure 28:
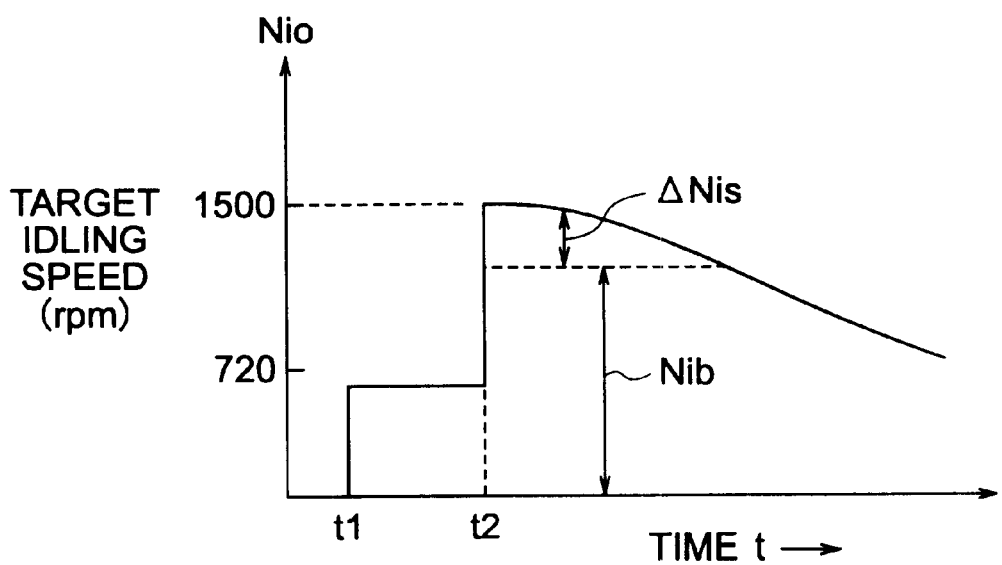
FIG. 28 is a diagram illustrating a change in the target idling rotational speed immediately after the start with the lapse of time during the normally controlled operation in relation to the embodiment 4 of the present invention.

FIGS. 26 to 28 are diagrams illustrating the operation for setting the idling rotational speed Ni according to the embodiment 4 of the present invention.

FIG. 26 is a diagram of characteristics illustrating a relationship between the target idling rotational speed Nio and the amount ΣQ of heat generated. In FIG. 26, the amount ΣQ of heat generated increases with an increase in the target idling rotational speed Ni.

FIG. 27 is a diagram of characteristics illustrating the target idling rotational speed Nio set depending upon the cooling water temperature TW, and FIG. 28 is a diagram illustrating a change in the target idling rotational speed Nio immediately after the start during the normally controlled operation.

In FIG. 27, a broken line represents the general target idling rotational speed (about 700 rpm), a curve of a solid line represents characteristics of the idling rotational speed Nin of during the normally controlled operation (when corrected toward the increasing side during the normally controlled operation), and a curve of a dot-dash chain line represents characteristics of the increased activating rotational speed NiU (=Nin+ΔNi(TW)) according to the present invention.

The idling rotational speed Nin of during the normally controlled operation is a value obtained by adding an increase correction amount to the general idling rotational speed (broken line), the increase correction amount decreasing with an increase in the cooling water temperature TW. Therefore, the idling rotational speed Nin of during the normally controlled operation converges to the general idling rotational speed (700 rpm) at a moment when the cooling water temperature TW is raised to about 80° C.

On the other hand, the increased activating rotational speed NiU decreases with an increase in the cooling water temperature TW but still remains at a value higher than the idling rotational speed Nin of during the normally controlled operation by the increase correction amount ΔNi(TW).

The increase correction amount ΔNi(TW) of the increased activating rotational speed NiU is a function of the cooling water temperature TW and, in this case, slightly decreases with an increase in the cooling water temperature TW.

Referring to FIG. 28, the target idling rotational speed Nio immediately after the start during the normally controlled operation is set to 700 rpm during the period of from a moment t1 of the start of the operation to a moment t2 of when the engine is really started, and is, then, increased to about 1500 rpm at the moment t2 when the engine is started.

At the moment t2 of when the engine is started, the target idling rotational speed Nio is set to a value obtained by adding an increase component ΔNis immediately after the start to the basic rotational speed Nib.

Referring to FIG. 22, the ECU 14 (see FIG. 38) judges whether the catalyst temperature TC is lower than the first predetermined temperature T1a (e.g., about 70° C.) or not (step S31). When it is judged that TC<T1a (i.e., YES), the target idling rotational speed Nio is set to the idling rotational speed Nin of during the normally controlled operation (step S32).

When it is judged at the step S31 that TC≧T1a (i.e., NO), the first tailing processing is executed with the first rotational speed Ni1 (corresponds to the increased activating rotational speed NiU) as a target value Nio.

In the first tailing processing (step S33), the target idling rotational speed Nio gradually increases toward the increased activating rotational speed NiU.

That is, the first rotational speed Ni1 is not readily set to the increased activating rotational speed NiU, but is gradually increased from the idling rotational speed Nin of during the normally controlled operation to the increased activating rotational speed NiU, so that the feeling of driving will not be deteriorated.

Next, the ECU 14 judges whether the catalyst temperature TC is higher than the second predetermined temperature T2a (>T1a) that corresponds to the activating temperature (about 130° C.) or not (i.e., whether the catalyst temperature TC has reached the activating temperature or not) (step S34).

When it is judged that TC>T2a (i.e., YES), it is so regarded that the catalyst is activated to a sufficient degree, and the second tailing processing is executed with the second rotational speed Ni2 (corresponds to the idling rotational speed Nin of during the normally controlled operation) as a target value Nio (step S35), and the processing routine of FIG. 22 returns.

In the second tailing processing (step S35), the second rotational speed Ni2 is not readily set to the idling rotational speed Nin of during the normally controlled operation, but is gradually decreased from the second rotational speed Ni2 (increased activating rotational speed NiU) down to the idling rotational speed Nin of during the normally controlled operation as shown in FIG. 24 (which will be described later), so that the feeling of driving will not be deteriorated.

On the other hand, when it is judged at the step S34 that TC≦T2a (i.e., NO), the step S35 is not executed and the processing routine of FIG. 22 returns.

Thus, within the range T1a≦TC≦T2a, the target idling rotational speed Nio is set to the increased activating rotational speed NiU (first rotational speed N12).

Concretely, the first tailing processing (step S33) in FIG. 22 is executed as illustrated in FIG. 23.

Referring to FIG. 23, the tailing means, first, judges whether the timing is a predetermined timing for executing the step S33 or not (step S41). When it is so judged that the timing is not the predetermined timing (i.e., NO), then, the processing routine of FIG. 23 returns.

When it is judged at the step S41 that the timing is a predetermined timing (i.e., YES), the first rotational speed Ni1 is gradually increased through a minimum value selection processing (step S42), and the processing routine of FIG. 23 returns.

In the minimum value selection processing (step S42), a value (minimum value min) of either the value (=Ni1(n−1)+ΔN1) obtained by adding the predetermined value ΔN1 to the first rotational speed Ni1(n−1) of the previous time or the increased activating rotational speed NiU whichever is smaller, is set as the first rotational speed Ni1 of this time.

That is, at the early stage, the first rotational speed Ni1 has been set to a value (smaller than the increased activating rotational speed NiU) smaller than the idling rotational speed Nin of during the normally controlled operation. Therefore, a value obtained by adding the predetermined value ΔN1 to the value of the previous time becomes a minimum value min, and set as the first rotational speed Ni1 of this time.

Thereafter, the first rotational speed Ni1 is gradually increased by the addition of the predetermined value ΔN1 every time when the step S42 is executed, and is clipped to the increased activating rotational speed NiU at a moment when the increased activating rotational speed NiU is reached.

In order to quicken the increase, furthermore, the predetermined value ΔN1 may be set to infinity.

Furthermore, the initial value of the first rotational speed Ni1 may be set to be the same as the idling rotational speed Nin of during the normally controlled operation.

On the other hand, the second tailing processing (step S35) in FIG. 22 is executed as illustrated in FIG. 24.

In FIG. 24, the tailing means, first, judges whether the timing is a predetermined timing for executing the step S35 or not (step S41A). When it is judged that the timing is not the predetermined timing (i.e., NO), then, the processing routine of FIG. 24 returns.

When it is judged at the step S41A that the timing is the predetermined timing (i.e., YES), the second rotational speed Ni2 is gradually decreased through a maximum value selection processing (step S42A), and the processing routine of FIG. 24 returns.

In the maximum value selection processing (step S42A), a value (maximum value max) of either the value (=Ni2(n−1)−ΔN2) obtained by subtracting the predetermined value ΔN2 from the second rotational speed Ni2(n−1) of the previous time or the idling rotational speed Nin of during the normally controlled operation whichever is larger, is set as the second rotational speed Ni2.

That is, in the early stage, the second rotational speed Ni2 is in agreement with the increased activating rotational speed NiU (or is larger than the idling rotational speed Nin of during the normally controlled operation). Therefore, a value obtained by subtracting the predetermined value ΔN2 from the value of the previous time becomes a maximum value max and is set as the second rotational speed Ni2 of this time.

Thereafter, the second rotational speed Ni2 is gradually decreased by the subtraction of the predetermined value ΔN2 every time when the step S42A is executed, an is clipped to the idling rotational speed Nin of during the normally controlled operation at a moment when the second rotational speed Ni2 is decreased down to the idling rotational speed Nin of during the normally controlled operation.

As shown in FIG. 25, therefore, the real target idling rotational speed Nio is set to the increased activating rotational speed NiU within the range T1a≦TC≦T2a.

In the same manner as described above, therefore, the catalyst temperature TC can be effectively raised to the activating temperature.

Embodiment 5

In the above-mentioned embodiment 4, the increased activating rotational speed NiU was set to Nin+100 rpm. However, the increased activating rotational speed NiU may be set to any other rotational speed determined from the heat capacity CE of the exhaust system within a range in which there arouses no problem in regard to the fuel consumption and the drivability.

That is, when the amount of increase of the idling rotational speed is set to be too great, noise is generated and fuel efficiency is deteriorated. Therefore, the amount of increase of the idling rotational speed is set within a range which is most efficient without arousing problem.

Embodiment 6

In the above-mentioned embodiment 4, the temperature sensor was used as the catalyst temperature pick-up means for directly detecting the catalyst temperature TC. However, the catalyst temperature TC may be estimated from the exhaust gas temperature TH by using the exhaust-gas-temperature sensor that detects the exhaust gas temperature TH, or may be estimated from other operation conditions.

Embodiment 7

In the above-mentioned embodiment 4, furthermore, the target idling rotational speed Nio was increased to the increased activating rotational speed NiU in order to promote the rise of the catalyst temperature TC. It is, however, also allowable to combine the constitution of the above-mentioned embodiment 1 (the target air-to-fuel ratio A/FO is set to the lean activating air-to-fuel ratio A/FL).

Figure 29:
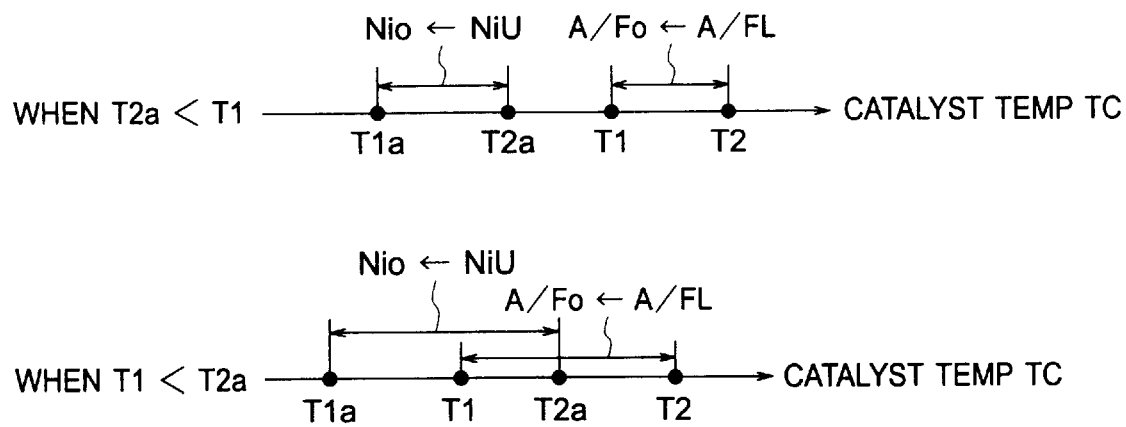
FIG. 29 is a diagram illustrating the control operation by combining the correction of the idling rotational speed toward the increasing side and the correction of the air-to-fuel ratio toward the lean side according to an embodiment 7 of the present invention.

FIG. 29 is a diagram illustrating the control operation of an embodiment 7 of the present invention of when the correction for increasing the idling rotational speed and the correction of the air-to-fuel ratio toward the lean side are combined together, wherein the abscissa represents the catalyst temperature TC.

Illustrated here are the cases where the predetermined temperatures T1$a$ and T2$a$ for increasing the idling rotational speed are different from the predetermined temperatures T1 and T2 for correcting the air-to-fuel ratio toward the lean side. In particular, illustrated here are the two cases where the predetermined temperatures T2$a$ and T1 are not the same.

In FIG. 29, when the predetermined temperatures T2$a$ and T1 are so set as to satisfy a relationship T2$a$<T1, the correction for increasing the idling rotational speed (Nio←NiU) is executed in a region where the catalyst temperature TC is relatively low (T1$a$<TC<T2$a$), and the correction of the air-to-fuel ratio toward the lean side (A/Fo←A/FL) is executed in a region where the catalyst temperature TC is relatively high (T1<TC<T2).

In this case, after the catalyst temperature TC is raised to some extent by the correction for increasing the idling rotational speed, the catalyst temperature TC is further raised by the correction of the air-to-fuel ratio toward the lean side, so that the catalyst is reliably heated up to the activating temperature.

When the predetermined temperatures T2$a$ and T1 are set to satisfy a relationship T1<T2$a$, on the other hand, the correction for increasing the idling rotational speed (Nio←NiU) and the correction of the air-to-fuel ratio toward the lean side (A/Fo←A/FL) are both executed in a region where the catalyst temperature TC represents an intermediate temperature (T1<TC<T2$a$).

In the region of the intermediate temperature (T1<TC<T2$a$), in this case, heat is supplied in a strikingly increased amount to the catalyst owing to the synergistic effect of an increased amount of oxygen due to a lean air-to-fuel ratio and an increased amount of the supplied air due to an increased idling rotational speed. Besides, an excess of the air (oxygen) promotes the oxidation reaction of the catalyst, enabling the rise of the catalyst temperature to be further promoted.

By combining the correction for increasing the idling rotational speed and the correction of the air-to-fuel ratio toward the lean side, as described above, the rise of the catalyst temperature is promoted by the synergistic effect of the two, and the catalyst temperature TC is quickly brought to the activating temperature.

Embodiment 8

In the above-mentioned embodiment 7, the correction for increasing the idling rotational speed and the correction of the air-to-fuel ratio toward the lean side were combined together to promote the rise of the catalyst temperature TC. However, the temperature of the exhaust gases may be further raised by the combination with the correction of the ignition timing toward the delay side.

Described below is the control operation of an embodiment 8 of the present invention to which is added the correction of the ignition timing toward the delay side.

In this case, the ECU 14 (see FIG. 38) includes an ignition timing control means for controlling the ignition timings of the engine 1 depending upon the operation conditions, and an ignition timing delaying means for correcting a target ignition timing Po from an ignition timing Pn of during the normally controlled operation to a delayed activating ignition timing PR which is on the delay side over a second predetermined period when the catalyst temperature TC is lower than a predetermined temperature.

The ignition timing delaying means in the ECU 14 includes a first comparator means for comparing the catalyst temperature TC with a first predetermined temperature T1$b$ lower than the activating temperature, a second comparator means for comparing the catalyst temperature TC with a second predetermined temperature T2$b$ higher than the first predetermined temperature T1$b$ and is corresponding to the activating temperature, and a tailing means for gradually changing the target ignition timing Po when the target ignition timing Po is to be changed over.

The tailing means gradually delays the target ignition timing Po from the ignition timing Pn of during the normally controlled operation to the delayed activating ignition timing PR (i.e., decreases the control quantity) every time by a predetermined value ΔP1 when the catalyst temperature TC is higher than the first predetermined temperature T1$b$, and gradually advances the target ignition timing Po from the delayed activating ignition timing PR to the ignition timing Pn of during the normally controlled operation (i.e., increases the control quantity) every time by a predetermined value ΔP2 when the catalyst temperature TC is higher than the second predetermined temperature T2$b$.

The second predetermined period for correcting the ignition timing toward the delay side is set depending upon the exhaust gas temperature TH and the catalyst temperature TC, so that there arouses no problem concerning the drivability.

The ignition timing delaying means in the ECU 14 variably sets at least either the delayed activating ignition timing PR or the second predetermined period depending upon the catalyst temperature TC.

FIGS. 30 to 35 are diagrams for explaining the control operation according to the embodiment 8 of the present invention.

Figure 30:
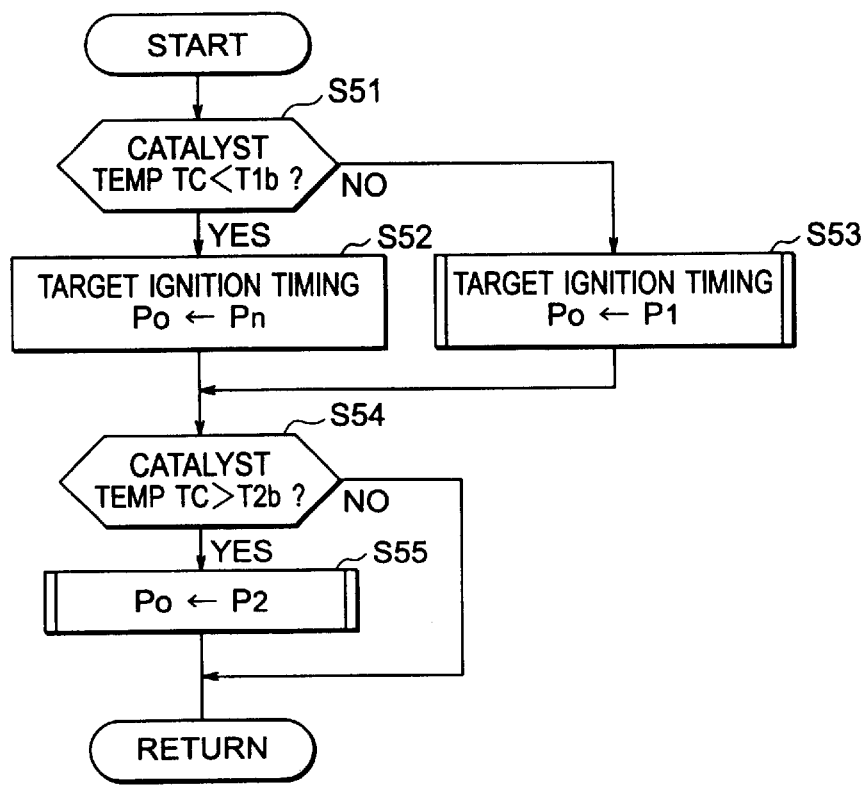
FIG. 30 is a flow chart illustrating a processing for correcting the ignition timing for promoting the activation of the catalyst depending upon the catalyst temperature according to an embodiment 8 of the present invention.

FIG. 30 is a flow chart illustrating a processing for correcting the ignition timing to promote the activation of the catalyst depending upon the catalyst temperature TC. To simplify the description, here, attention is given to only the processing for correcting the ignition timing toward the delay side.

Figure 31:
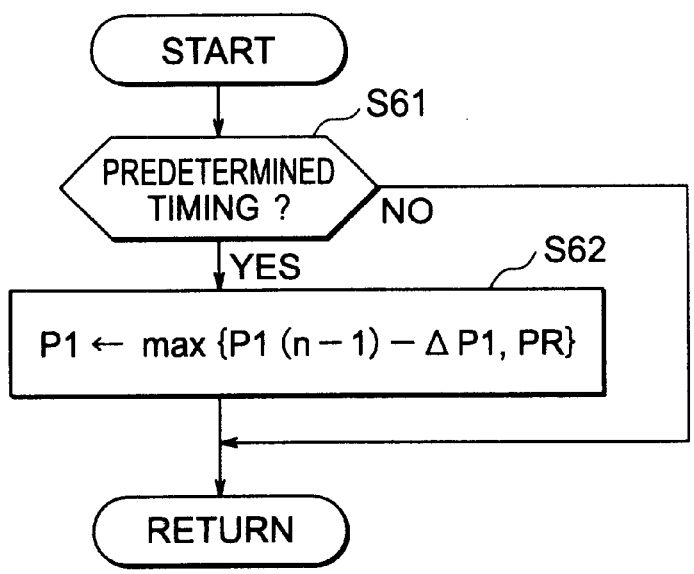
FIG. 31 is a flow chart concretely illustrating the tailing processing operation (step S53) for correcting the ignition timing toward the delay side according to the embodiment 8 of the present invention.
Figure 32:
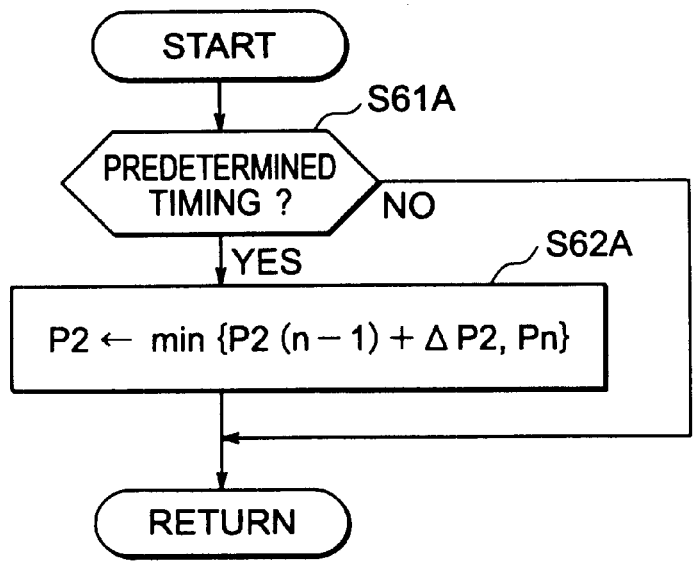
FIG. 32 is a flow chart concretely illustrating the tailing processing operation (step S55) for restoring the normal ignition timing according to the embodiment 8 of the present invention.

FIG. 31 is a flow chart illustrating a step S53 (first tailing processing with the first ignition timing P1 as a target value) in FIG. 30, and FIG. 32 is a flow chart illustrating a step S55 (second tailing processing with the second ignition timing P2 as a target value) in FIG. 30.

Figure 33:
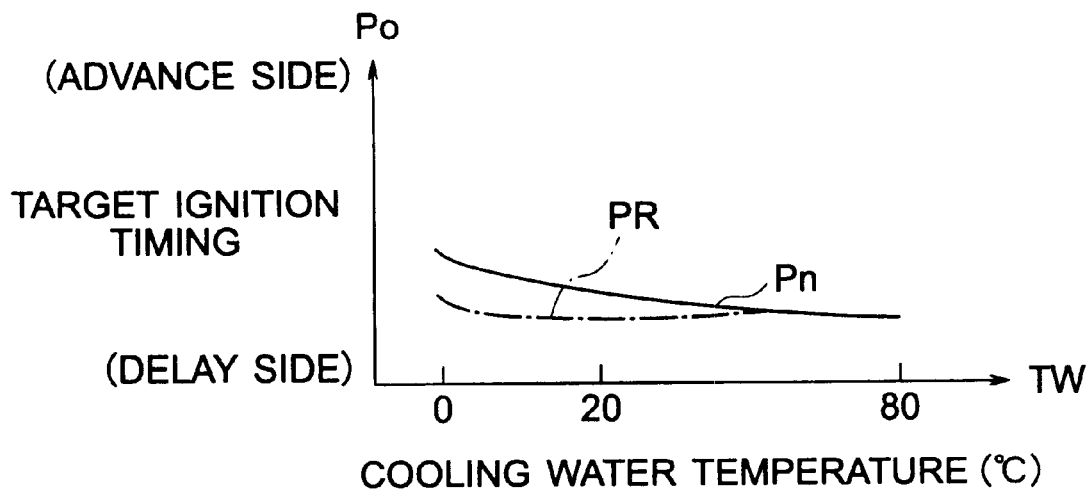
FIG. 33 is a diagram of characteristics illustrating a change in the target ignition timing depending-upon the cooling water temperature according to the embodiment 8 of the present invention.

FIG. 33 is a diagram of characteristics illustrating a change in the target ignition timing Po relative to the cooling water temperature TW, wherein the ordinate (corresponds to the target ignition timing Po) represents the advance side in the forward direction.

In FIG. 33, a curve of a solid line represents a change in the ignition timing Pn of during the normally controlled operation, and a curve of a dot-dash chain line represents a change in the delayed activation ignition timing PR.

The ignition timing Pn (see solid line) of during the normally controlled operation shifts toward the delay side with a rise in the cooling water temperature TW, and remains nearly constant when the cooling water temperature TW reaches about 80 ° C.

On the other hand, the delayed activating ignition timing PR (see a dot-dash chain line) is corrected toward the delay side beyond the ignition timing Pn of during the normally controlled operation, but the amount of delay decreases with a rise in the cooling water temperature TW.

Figure 34:
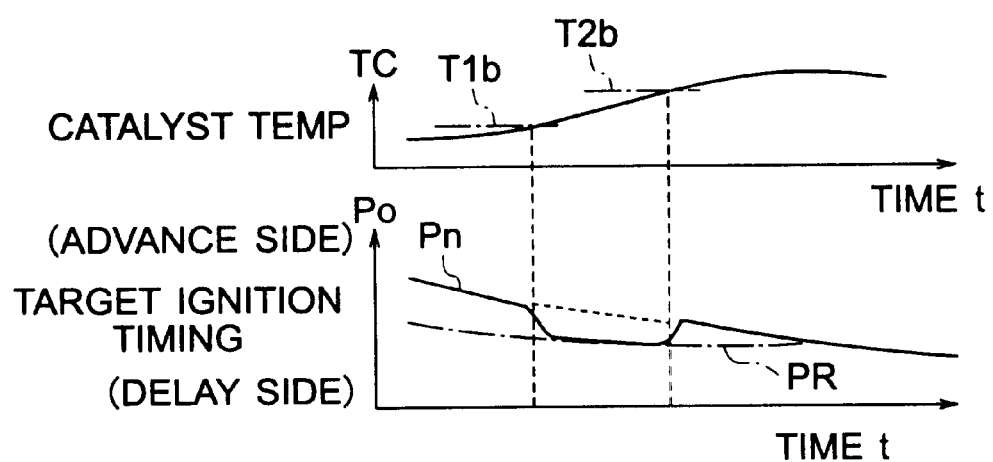
FIG. 34 is a timing chart illustrating changes in the catalyst temperature and the target ignition timing with the lapse of time according to the embodiment 8 of the present invention.

FIG. 34 is a timing chart illustrating changes in the catalyst temperature TC and in the target ignition timing Po with the lapse of time.

In FIG. 34, the target ignition timing Po is set to the delayed activating ignition timing PR during a period in which the catalyst temperature TC lies between the first predetermined temperature T1$b$ and the second predetermined temperature T2$b$.

FIG. 35 is a diagram illustrating the control operation of when the correction for increasing the idling rotational speed (Nio←NiU), the correction of the air-to-fuel ratio toward the lean side (A/Fo←A/FL) and the correction for delaying the ignition timing (Po←PR) are combined together, and wherein the abscissa represents the catalyst temperature TC.

FIG. 35 illustrates the cases where the predetermined temperatures that serve as references for comparison with the catalyst temperature TC are different. The first and second predetermined temperatures, however, may be set to the same values.

Referring to FIG. 30, the ECU 14 judges whether the catalyst temperature TC is lower than the first predetermined temperature T1$b$ or not (step S51). When it is judged that TC<T1$b$ (i.e., YES), then, the target ignition timing Po is set to the ignition timing Pn of during the normally controlled operation (step S52).

When it is judged at the step S51 that TC≧T1$b$ (i.e., NO), the first tailing processing is executed with the first ignition timing P1 (corresponds to the delayed activating ignition timing PR) as a target value Po (step S53).

In the first tailing processing (step S53), the target ignition timing Po is gradually decreased (delayed) toward the delayed activating ignition timing PR.

That is, the first ignition timing P1 is not readily set to the delayed activating ignition timing PR, but is gradually decreased (shifted toward the delay side) from the ignition timing Pn of during the normally controlled operation to the delayed activating ignition timing PR as shown in FIG. 31 (described later), so that the feeling of driving will not be deteriorated.

Then, the ECU 14 judges whether the catalyst temperature TC is higher than the second predetermined temperature T2$b$ (>T1$b$) or not (step S54). When it is judged that TC>T2$b$ (i.e., YES), the second tailing processing is executed with the second ignition timing P2 (corresponds to the ignition timing Pn of during the normally controlled operation) as a target value Po (step S55), and the processing routine of FIG. 30 returns.

In the second tailing processing (step S55), the second ignition timing P2 is not readily set to the ignition timing Pn of during the normally controlled operation, but is gradually increased (advanced) from the second ignition timing P2 (delayed activating ignition timing PR) to the ignition timing Pn of during the normally controlled operation as shown in FIG. 32 (described later), so that the feeling of driving will not be deteriorated.

When it is judged at the step S54 that TC≦T2$a$ (i.e., NO), on the other hand, the processing routine of FIG. 30 returns without executing the step S55.

Thus, the target ignition timing Po is set to the delayed activating ignition timing PR (first ignition timing P1) within the range T1$b$≦TC≦T2$b$.

Concretely, the first tailing processing (step S53) in FIG. 30 is executed as shown in FIG. 31.

In FIG. 31, the tailing means in the ECU 14, first, judges whether the timing is a predetermined timing for executing the step S53 or not (step S61). When it is judged that the timing is not the predetermined timing (i.e., NO), the processing routine of FIG. 31 returns.

When it is judged at the step S61 that the timing is a predetermined timing (i.e., NO), the first ignition timing P1 is gradually decreased through a maximum value (maximum advancing angle) selection processing (step S62), and the processing routine of FIG. 31 returns.

In the maximum value selection processing (step S62), a value of the advancing side (maximum value max) of either the value (=P1(n−1)−ΔP1) obtained by subtracting the predetermined value ΔP1 from the first ignition timing P1(n−1) of the previous time or the delayed activating ignition timing PR whichever is larger, is set as the first ignition timing P1 of this time.

That is, in the initial stage, the first ignition timing P1 is set to the ignition timing Pn of during the normally controlled operation (large value on the advancing side beyond the delayed activating ignition timing PR). Therefore, a value obtained by subtracting the predetermined value ΔP1 from the value of the previous time serves as the maximum value max and is set as the first ignition timing P1 of this time.

Thereafter, the first ignition timing P1 is gradually decreased (delayed) by the predetermined value ΔP1 every time when the step S62 is executed, and is clipped to the delayed activating ignition timing PR at a moment when the delayed activating ignition timing PR is reached.

On the other hand, the second tailing processing (step S55) in FIG. 30 is executed as shown in FIG. 32.

In FIG. 32, the tailing means judges whether the timing is the predetermined timing for executing the step S55 or not (step S61A). When it is judged that the timing is not the predetermined timing (i.e., NO), the processing routine of FIG. 32 returns.

When it is judged at the step S61A that the timing is the predetermined timing (i.e., YES), the second ignition timing P2 is gradually increased through a minimum value selection processing (step S62A), and the processing routine of FIG. 32 returns.

In the minimum value selection processing (step S62A), a value of the delay side (minimum value min) of either the value (=P2(n−1)+ΔP2) obtained by adding the predetermined value ΔP2 to the second ignition timing P2(n−1) of the previous time or the ignition timing Pn of during the normally controlled operation whichever is smaller, is set as the second ignition timing P2.

That is, in the early stage, the second ignition timing P2 is in agreement with the delayed activating ignition timing PR (smaller than the ignition timing Pn of during the normally controlled operation). Therefore, a value obtained by adding the predetermined value ΔP2 to the value of the previous time becomes the minimum value min and is set as the second ignition timing P2 of this time.

Thereafter, the second ignition timing P2 gradually increases (advances) by the predetermined value ΔP2 for every execution of the step S62A, and is clipped to the ignition timing Pn of during the normally controlled operation at a moment when the ignition timing Pn of during the normally controlled operation is reached.

Then, the real target ignition timing Po is set to the delayed activating ignition timing PR within the range T1b<TC<T2b as shown in FIG. 34.

Therefore, the catalyst temperature TC can be effectively raised to the activating temperature in the same manner as described above.

The predetermined temperatures T1b and T2b which serve as references for comparison for judging the activation are set in a manner as shown in, for example, FIG. 35.

In FIG. 35, the predetermined temperatures T1b and T2b for correcting the ignition timing toward the delay side are set within a range of the predetermined temperatures T1a and T2a for correcting the idling rotational speed toward the increasing side.

Illustrated here are two cases where the predetermined temperature T1 for correcting the air-to-fuel ratio toward the lean side is set to satisfy a relationship T2b<T2a<T1 and is set to satisfy a relationship T1<T2b<T2a.

When the predetermined temperatures are set to satisfy, for example, the relationship T2b<T2a<T1, the correction for increasing the idling rotational speed (Nio←NiU) and the correction for delaying the ignition timing (Po←PR) are executed in the region where the catalyst temperature TC is relatively low (T1a<TC<T2a), and the correction of the air-to-fuel ratio toward the lean side (A/Fo←A/FL) is executed in the region where the catalyst temperature TC is relatively high (T1<TC<T2).

When the predetermined temperatures are set to satisfy the relationship T1<T2b<T2a, on the other hand, the correction for increasing the idling rotational speed (Nio←NiU), the correction of the air-to-fuel ratio toward the lean side (A/Fo←A/FL) and the correction for delaying the ignition timing (Po←PR) are all executed in the region where the catalyst temperature TC represents an intermediate temperature (T1<TC<T2b).

In the intermediate temperature region (T1<TC<T2i b), in this case, heat is supplied in a greatly increased amount to the catalyst owing to the synergistic effect of an increase in the amount of the supplied air due to the corrections and an increase in the exhaust gas temperature. Besides, an excess of the air (oxygen) promotes the oxidation reaction of the catalyst, to further promote the rise of the catalyst temperature.

Thus, the rise of the catalyst temperature is further promoted by the combination with the correction for delaying the ignition timing toward the delay side in addition to the correction for increasing the idling rotational speed and the correction of the air-to-fuel ratio toward the lean side, and the catalyst temperature TC quickly arrives at the activating temperature.

Embodiment 9

In the above-mentioned embodiment 8, the target ignition timing Po was simply corrected toward the delay side over the second predetermined period of time. However, the target ignition timing Po may be intermittently corrected toward the delay side over the second predetermined period of time.

Described below is an embodiment 9 of the present invention in which the target ignition timing Po is intermittently corrected toward the delay side.

Figure 36:
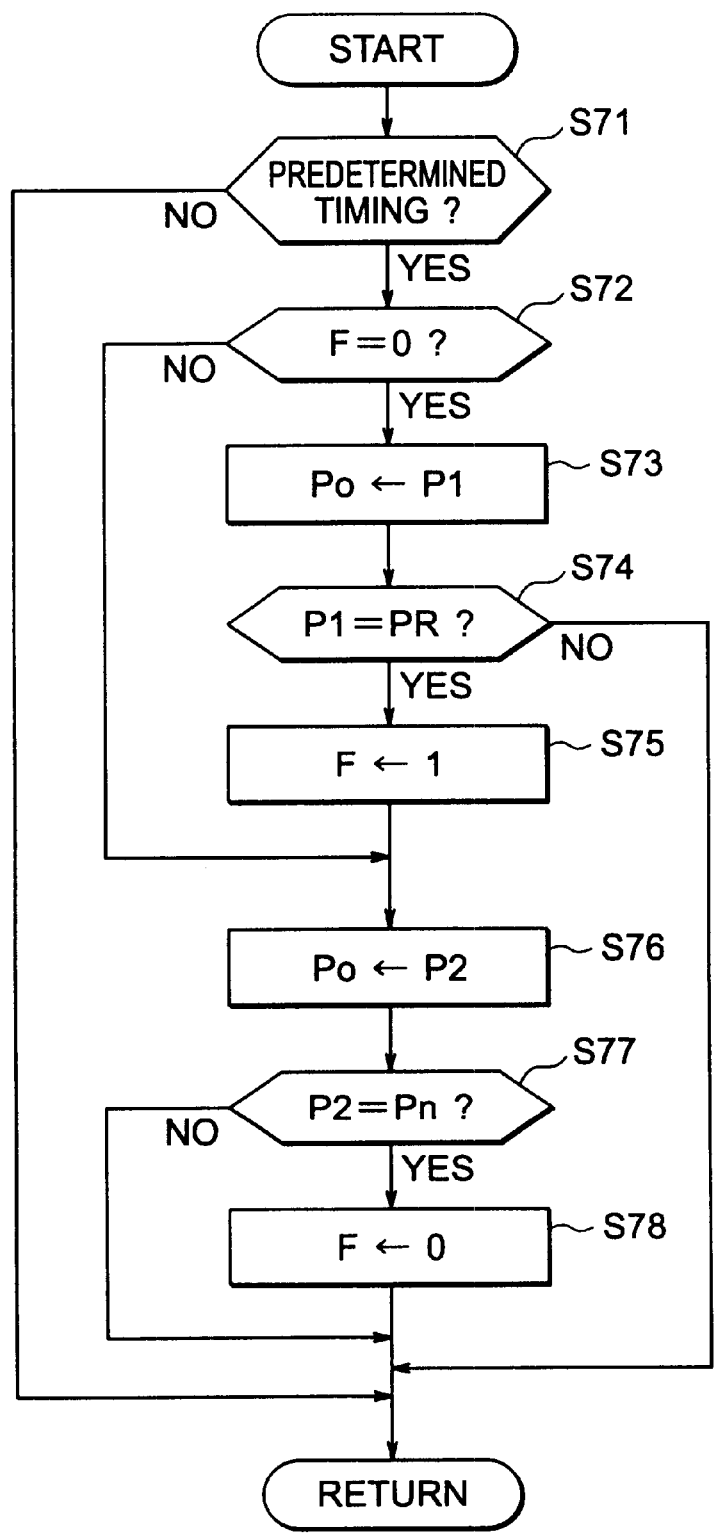
FIG. 36 is a flow chart illustrating the control operation according to an embodiment 9 of the present invention.
Figure 37:
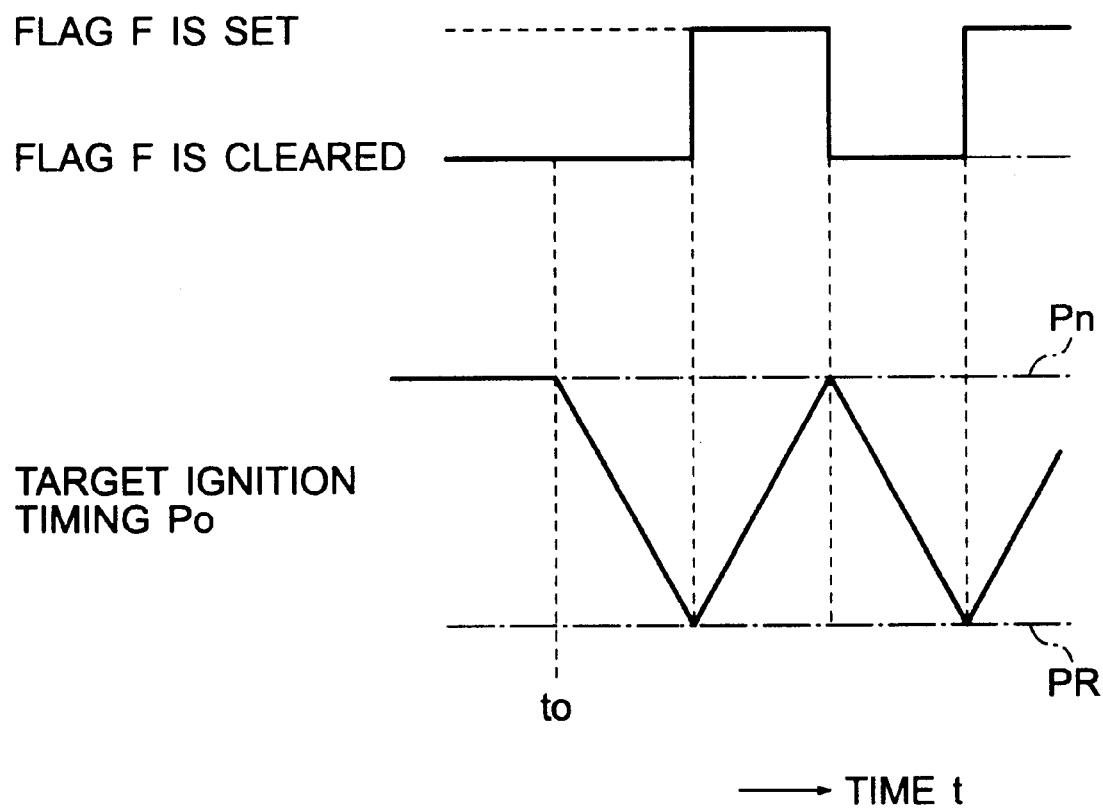
FIG. 37 is a timing chart illustrating the control operation according to the embodiment 9 of the present invention.

FIGS. 36 and 37 are a flow chart and a timing chart illustrating the control operation according to the embodiment 9 of the present invention.

In FIG. 36, steps S73 and S76 are corresponding to the step S53 (see FIG. 31) and the step S55 (see FIG. 32) in FIG. 30.

In FIG. 37, the target ignition timing Po returns to the ignition timing Pn of during the normally controlled operation as a flag F is set (on) to restore the ignition timing, and is shifted toward the delayed activating ignition timing PR as the flag F is cleared (off).

Referring to FIG. 36, the ignition timing correction means in the ECU 14 judges whether the timing is a predetermined timing for executing the processing routine of FIG. 36 or not (step S71). When it is judged that the timing is not the predetermined timing (i.e., NO), the processing routine of FIG. 36 returns.

When it is judged at the step S71 that the timing is the predetermined timing (i.e., YES), it is, then, judged whether the flag F has been cleared (F=0) or not (step S72).

When it is judged that F=0 (i.e., YES), the first ignition timing P1 is set as a target ignition timing Po (processing of FIG. 31 is executed) in order to gradually shift the target ignition timing Po toward the delayed activating ignition timing PR (step S73).

Upon repetitively executing the step S73, the first ignition timing P1 is decreased (delayed) as described earlier.

It is, then, judged whether the first ignition timing P1 is in agreement with the delayed activating ignition timing PR or not (step S74). When it is judged that P1≠PR (i.e., NO), then, the processing routine of FIG. 36 returns. When it is judged at the step S74 that P1=PR (i.e., YES), the flag F is set to "1" (step S75), and the second ignition timing P2 is set as a target ignition timing Po (processing of FIG. 32 is executed) so that the target ignition timing Po gradually returns to the ignition timing Pn of during the normally controlled operation (step S76).

On the other hand, when it is so judged at the step S72 that F=1 (i.e., NO), the routine readily proceeds to the step S76.

Upon repetitively executing the step S76, the second ignition timing P1 increases (advances) as described earlier.

Then, it is judged whether the second ignition timing P2 is in agreement with the ignition timing Pn of during the normally controlled operation or not (step S77). When it is judged that P1≠Pn (i.e., NO), the processing routine of FIG. 36 returns.

When it is so judged at the step S77 that P2=Pn (i.e., YES), the flag F is cleared to "0" (step S78), and the processing routine of FIG. 36 returns.

Thus, as shown in FIG. 37, the target ignition timing Po is gradually shifted from a moment t0 of starting the control operation toward the delayed activating ignition timing PR (corrected toward the delay side) in response to the on/off of the flag F.

This makes it possible to promote the rise of the catalyst temperature TC by increasing the amount of heat supplied to the catalyst yet minimizing the degradation of drivability caused by the correction of the ignition timing toward the delay side.

The rise of the catalyst temperature TC can be more effectively promoted provided the ignition timing is intermittently controlled toward the delay side over the second predetermined period of time depending upon the exhaust gas temperature TH or the catalyst temperature TC.

Embodiment 10

In the above-mentioned embodiment 8, the correction for increasing the idling rotational speed, the correction of the air-to-fuel ratio toward the lean side and the correction for delaying the ignition timing were combined together. It is, however, also allowable to combine only the correction for increasing the idling rotational speed and the correction for delaying the ignition timing together, excluding the correction of the air-to-fuel ratio toward the lean side, to obtain distinguished effect owing to the synergistic effect same as the one described above.

What is claimed is:

1. A device for controlling the rise of the catalyst temperature in an internal combustion engine, said device comprising:

a catalyst which is a three-way converter provided in an exhaust pipe of the internal combustion engine;

a catalyst temperature pick-up means for picking up data corresponding to the temperature of the catalyst as catalyst temperature;

a plurality of sensors for detecting operation conditions of said internal combustion engine, wherein said sensors include an air intake sensor and a water temperature sensor;

an idling control means for controlling the idling rotational speed of said internal combustion engine depending upon said operation conditions;

an idling rotational speed increasing means which, when said catalyst temperature is lower than a predetermined temperature corresponding to an activating temperature of said catalyst, corrects a target idling rotational speed of said internal combustion engine toward the increasing side higher than the idling rotational speed of during the normally controlled operation in order to promote the activation of said catalyst;

wherein, when said catalyst temperature is lower than said predetermined temperature, said idling rotational speed increasing means sets said target idling rotational speed to an increased activating rotational speed higher than the idling rotational speed of during said normally controlled operation for a predetermined period of time until said catalyst temperature reaches said activating temperature, and wherein said idling rotational speed increasing means includes, a first comparator means for comparing said catalyst temperature with a first predetermined temperature lower than said activating temperature; and a second comparator means for comparing said catalyst temperature with a second predetermined temperature which is higher than said first predetermined temperature and is corresponding to said activating temperature;

and sets said target idling rotational speed to said increased activating rotational speed when said catalyst temperature lies within a range between said first predetermined temperature and said second predetermined temperature.

2. A device for controlling the rise of the catalyst temperature in an internal combustion engine according to claim 1, wherein said idling rotational speed increasing means includes:

a tailing means for gradually changing said target idling rotational speed when said target idling rotational speed is to be changed over; and said tailing means:

gradually increases said target idling rotational speed from the idling rotational speed of during said normally controlled operation up to said increased activating rotational speed every time by a predetermined value when said catalyst temperature is higher than said first predetermined temperature; and gradually decreases said target idling rotational speed from said increased activating rotational speed down to the idling rotational speed of during said normally controlled operation when said catalyst temperature is higher than said second predetermined temperature.

3. A device for controlling the rise of the catalyst temperature in an internal combustion engine according to claim 1, wherein said catalyst temperature pick-up means includes a catalyst temperature estimating means for estimating the temperature of said catalyst based on at least the water temperature of said internal combustion engine at the start and the intake-air-amount data.

4. A device for controlling the rise of the catalyst temperature in an internal combustion engine according to claim 1, wherein said idling rotational speed increasing means sets the increased activating rotational speed depending on the heat capacity of the exhaust system inclusive of said exhaust pipe.

5. A device for controlling the rise of the catalyst temperature in an internal combustion engine according to claim 1, wherein said idling rotational speed increasing means sets, as said increased activating rotational speed, said target idling rotational speed to a value which is higher by about 100 rpm than the idling rotational speed of during the normally controlled operation.

6. A device for controlling the rise of the catalyst temperature in an internal combustion engine according to claim 1, further comprising: plan air-to-fuel ratio control means for controlling the air-to-fuel ratio of said internal combustion engine depending upon the operation conditions;

and an air-to-fuel ratio lean-correction means for setting the target air-to-fuel ratio of said internal combustion engine to a lean activating air-to-fuel ratio which is larger than the air-to-fuel ratio of during the normally controlled operation and is larger than the stoichiometric air-to-fuel ratio when said catalyst temperature is lower than said predetermined temperature.

7. The invention further provides a device for controlling the rise of the catalyst temperature in an internal combustion engine according to claim 6, further comprising:

an ignition timing control means for controlling the ignition timing of said internal combustion engine depending upon the operation conditions; and an ignition timing delaying means for correcting a target ignition timing of said internal combustion engine to a delayed activating ignition timing on the side delayed behind the ignition timing of during the normally controlled operation over a second predetermined period of time when said catalyst temperature is lower than said predetermined temperature.

8. A device for controlling the rise of the catalyst temperature in an internal combustion engine according to claim 7, wherein said ignition timing delaying means includes:

a first comparator means for comparing said catalyst temperature with a first predetermined temperature lower than said activating temperature;

a second comparator means for comparing said catalyst temperature with a second predetermined temperature higher than said first predetermined temperature and is corresponding to said activating temperature; and a tailing means for gradually changing said target ignition timing when said target ignition timing is to be changed over;

wherein said tailing means gradually delays said target ignition timing from the ignition timing of during said normally controlled operation to said delayed activating ignition timing every time by a predetermined value when said catalyst temperature is higher than said first predetermined temperature, and gradually advances said target ignition timing from said delayed activating ignition timing to the ignition timing of during said normally controlled operation every time by a predetermined value when said catalyst temperature is higher than said second predetermined temperature.

* * * * *